(12) United States Patent
Kagami et al.

(10) Patent No.: US 9,954,212 B2
(45) Date of Patent: Apr. 24, 2018

(54) BATTERY, ELECTROLYTE, BATTERY PACK, ELECTRONIC DEVICE, ELECTRIC MOTOR VEHICLE, ELECTRICAL STORAGE DEVICE, AND POWER SYSTEM

(71) Applicant: SONY CORPORATION, Tokyo (JP)

(72) Inventors: Keiichi Kagami, Fukushima (JP); Kazuhito Hatta, Fukushima (JP); Nobuaki Shimosaka, Fukushima (JP); Keizo Koga, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/021,892

(22) PCT Filed: Aug. 11, 2014

(86) PCT No.: PCT/JP2014/004163
§ 371 (c)(1),
(2) Date: Mar. 14, 2016

(87) PCT Pub. No.: WO2015/049824
PCT Pub. Date: Apr. 9, 2015

(65) Prior Publication Data
US 2016/0233474 A1    Aug. 11, 2016

(30) Foreign Application Priority Data

Oct. 2, 2013   (JP) .................................. 2013-207141

(51) Int. Cl.
*H01M 2/16* (2006.01)
*B60L 3/00* (2006.01)
(Continued)

(52) U.S. Cl.
CPC ........... *H01M 2/166* (2013.01); *B60L 3/0046* (2013.01); *B60L 3/04* (2013.01); *B60L 7/14* (2013.01);
(Continued)

(58) Field of Classification Search
CPC ........ H01M 2/166; H01M 4/04; H01M 4/131; H01M 4/136; H01M 4/1391; H01M 4/38;
(Continued)

(56) References Cited

U.S. PATENT DOCUMENTS 9,362,554 B2 * 6/2016 Hara ..................... H01M 4/136
2001/0018150 A1 * 8/2001 Morita .................. H01M 4/133
429/231.8

(Continued)

FOREIGN PATENT DOCUMENTS

CN    103165842 A    6/2013
JP    10-214640      8/1998
(Continued)

OTHER PUBLICATIONS

JP2013-054973A, Mar. 21, 2013, pp. 1-49 Translated by JPO on Sep. 17, 2016.*
(Continued)

*Primary Examiner* — Behrang Badii
(74) *Attorney, Agent, or Firm* — K&L Gates LLP

(57) ABSTRACT

A battery includes electrodes including a positive electrode and a negative electrode; and a particle-containing insulating part that is provided between the positive electrode and the negative electrode and includes particles and a resin, wherein the particles are a material capable of undergoing an endothermic dehydration reaction and have a flat shape with an aspect ratio of 2/1 or more.

17 Claims, 15 Drawing Sheets

(51) Int. Cl.
| | |
|---|---|
| *B60L 3/04* | (2006.01) |
| *B60L 7/14* | (2006.01) |
| *B60L 11/14* | (2006.01) |
| *B60L 11/18* | (2006.01) |
| *B60L 15/20* | (2006.01) |
| *H01M 10/052* | (2010.01) |
| *H01M 10/056* | (2010.01) |
| *B60L 11/12* | (2006.01) |
| *B60L 15/00* | (2006.01) |
| *H01M 10/0525* | (2010.01) |
| *H01M 4/131* | (2010.01) |
| *H01M 4/04* | (2006.01) |
| *H01M 10/058* | (2010.01) |
| *H02J 7/00* | (2006.01) |
| *H01M 2/02* | (2006.01) |
| *C01B 33/38* | (2006.01) |

(52) U.S. Cl.
CPC ............ *B60L 11/123* (2013.01); *B60L 11/14* (2013.01); *B60L 11/1816* (2013.01); *B60L 11/1824* (2013.01); *B60L 11/1851* (2013.01); *B60L 11/1861* (2013.01); *B60L 11/1864* (2013.01); *B60L 11/1874* (2013.01); *B60L 11/1879* (2013.01); *B60L 15/007* (2013.01); *B60L 15/2009* (2013.01); *H01M 10/052* (2013.01); *H01M 10/056* (2013.01); *H01M 10/0525* (2013.01); B60L 2200/12 (2013.01); B60L 2200/22 (2013.01); B60L 2200/26 (2013.01); B60L 2240/12 (2013.01); B60L 2240/421 (2013.01); B60L 2240/423 (2013.01); B60L 2240/441 (2013.01); B60L 2240/443 (2013.01); B60L 2240/545 (2013.01); B60L 2240/662 (2013.01); B60L 2240/665 (2013.01); B60L 2250/16 (2013.01); B60L 2250/22 (2013.01); B60L 2270/145 (2013.01); *C01B 33/38* (2013.01); *H01M 2/0287* (2013.01); *H01M 4/04* (2013.01); *H01M 4/131* (2013.01); *H01M 10/058* (2013.01); *H01M 2200/00* (2013.01); *H01M 2220/20* (2013.01); *H02J 7/0011* (2013.01); Y02E 60/122 (2013.01); Y02T 10/645 (2013.01); Y02T 10/70 (2013.01); Y02T 10/7011 (2013.01); Y02T 10/7044 (2013.01); Y02T 10/7061 (2013.01); Y02T 10/7072 (2013.01); Y02T 10/7077 (2013.01); Y02T 10/72 (2013.01); Y02T 10/7275 (2013.01); Y02T 10/7291 (2013.01); Y02T 90/121 (2013.01); Y02T 90/14 (2013.01); Y02T 90/16 (2013.01); Y10S 903/907 (2013.01)

(58) Field of Classification Search
CPC ............ H01M 4/485; H01M 10/0525; H01M 4/0452; H01M 4/0469; H01M 4/64; H01M 4/1397; H01M 4/36; H01M 4/366; H01M 4/5825; H01M 4/621; H01M 4/623; B60L 3/0046; B60L 3/04; B60L 7/14; B60L 11/123; B60L 11/14; B60L 11/1816; B60L 11/1824; B60L 11/1851; B60L 11/1861; B60L 11/1864; B60L 11/1874; B60L 11/1879; B05D 5/12; C25D 9/08; C25D 9/00
See application file for complete search history.

(56) References Cited

U.S. PATENT DOCUMENTS

| 2008/0090138 | A1* | 4/2008 | Vu | H01M 2/16 |
| | | | | 429/129 |
| 2010/0173187 | A1* | 7/2010 | Nishikawa | H01M 2/145 |
| | | | | 429/129 |
| 2011/0135990 | A1* | 6/2011 | Yamamoto | H01M 4/136 |
| | | | | 429/144 |
| 2011/0143185 | A1* | 6/2011 | Nishikawa | H01M 2/162 |
| | | | | 429/145 |
| 2012/0189914 | A1* | 7/2012 | Hara | H01M 4/136 |
| | | | | 429/211 |
| 2013/0244115 | A1* | 9/2013 | Cao | H01M 4/131 |
| | | | | 429/231.5 |
| 2014/0141346 | A1* | 5/2014 | Fukuzumi | C01B 15/027 |
| | | | | 429/421 |

FOREIGN PATENT DOCUMENTS

| JP | 2004-210610 | 7/2004 |
| JP | 2009-256198 | 11/2009 |
| JP | 2009-277397 | 11/2009 |
| JP | 2010-198757 | 9/2010 |
| JP | 2013-028722 | 2/2013 |
| JP | 2013-054973 | 3/2013 |
| JP | 2013-534704 | 9/2013 |

OTHER PUBLICATIONS

International Search Report received in PCT/JP2014/004163, dated Apr. 9, 2015.
State Intellectual Property Office of the People's Republic of China, Office Action issued in Chinese Patent Application No. 201480053308.0 (related to above-captioned application), dated Nov. 3, 2017.

* cited by examiner

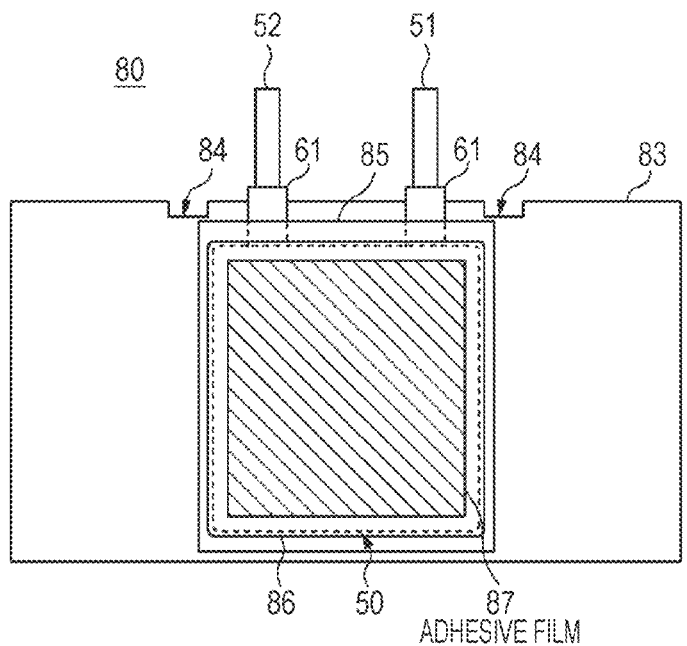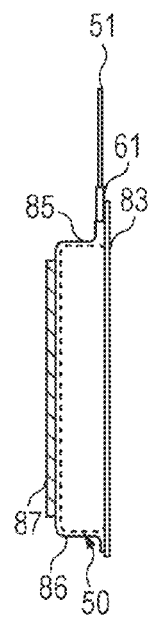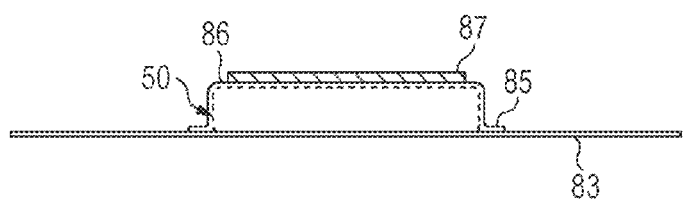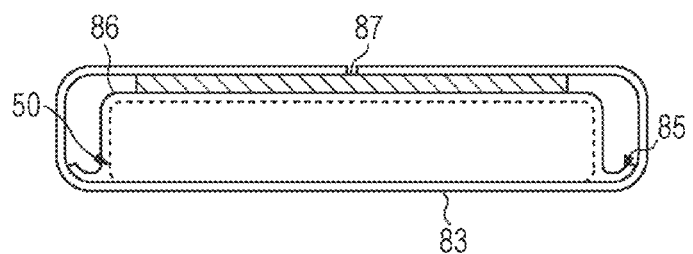

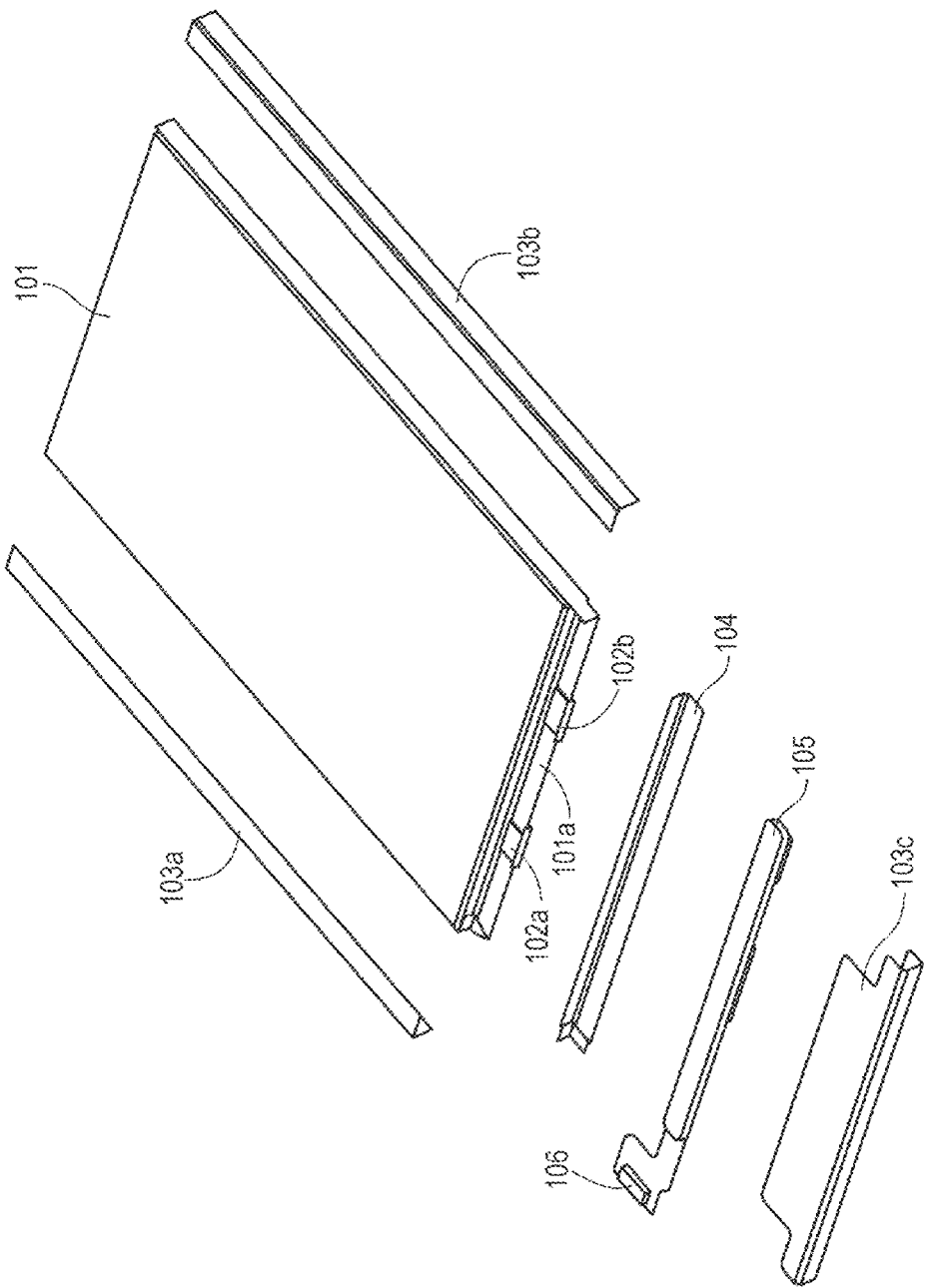

FIG. 15
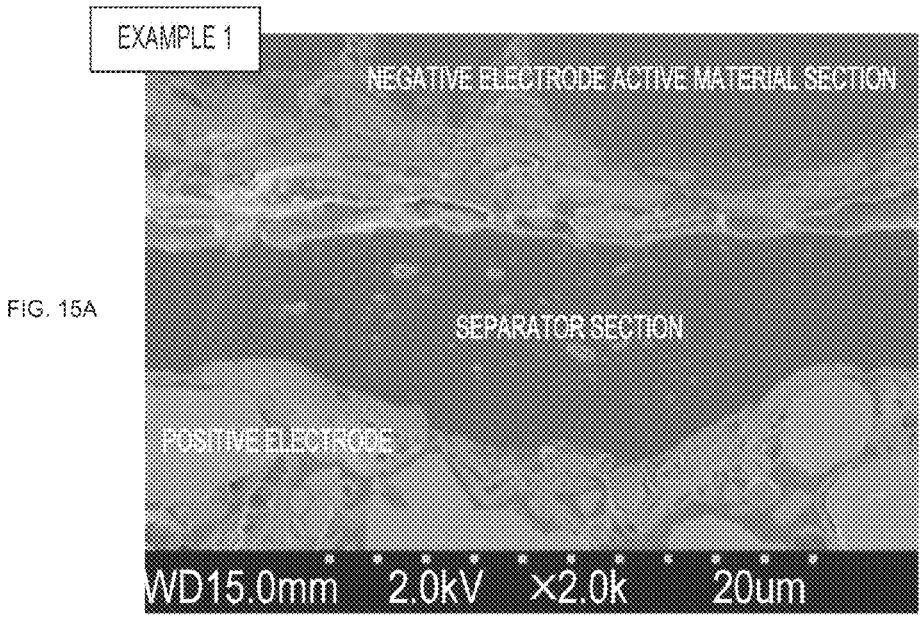
FIG. 15A
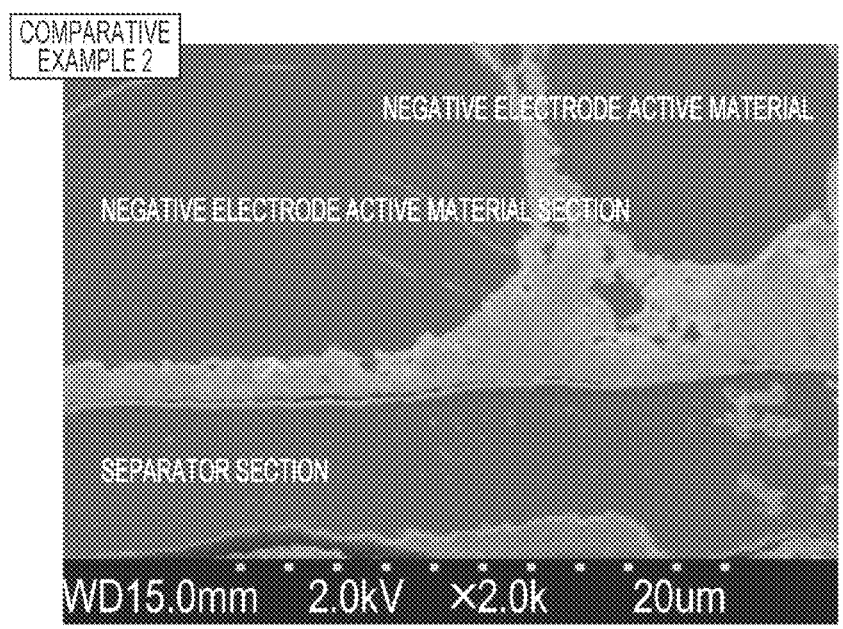
FIG. 15B

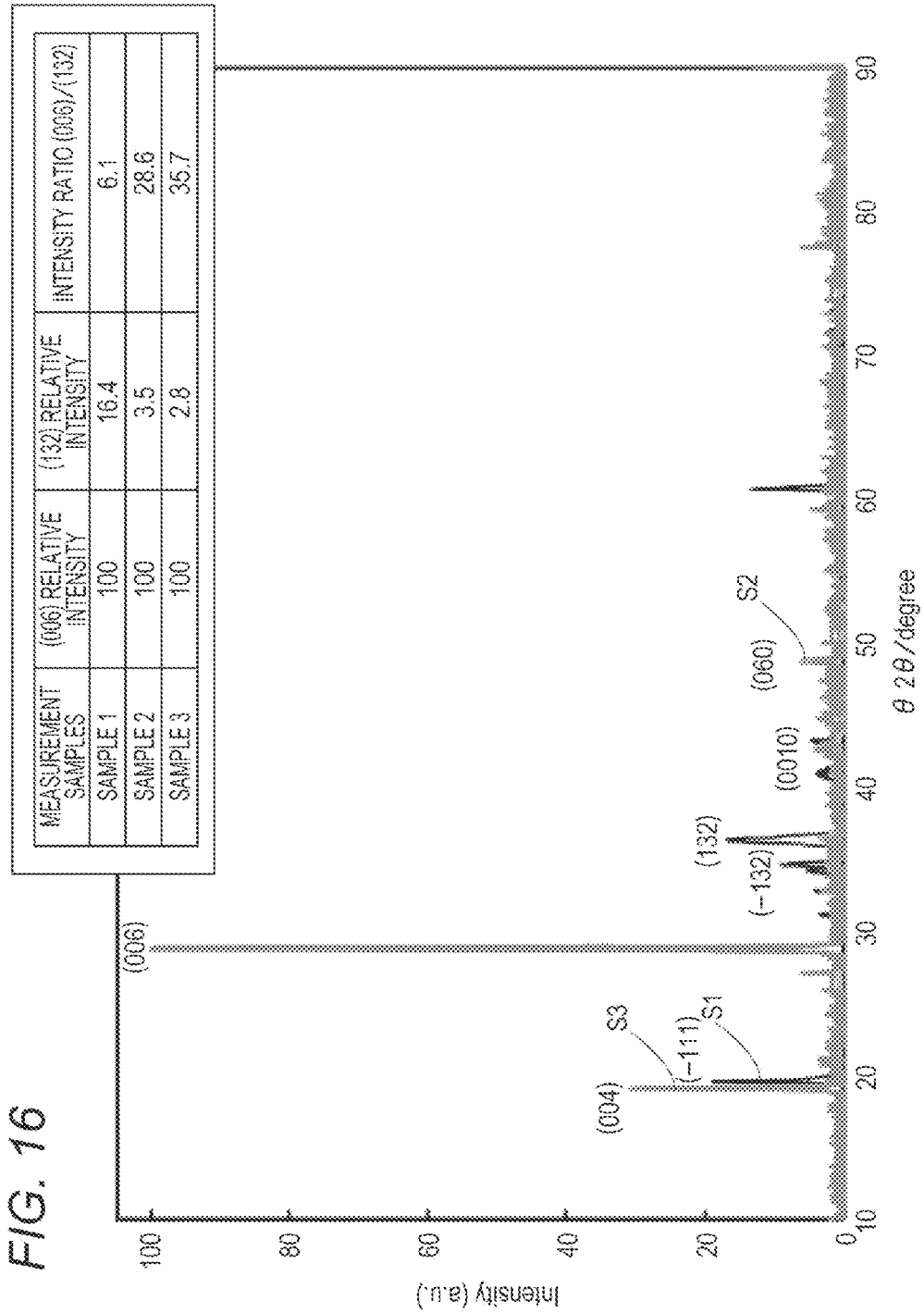

BATTERY, ELECTROLYTE, BATTERY PACK, ELECTRONIC DEVICE, ELECTRIC MOTOR VEHICLE, ELECTRICAL STORAGE DEVICE, AND POWER SYSTEM

CROSS REFERENCES TO RELATED APPLICATIONS

The present application is a national stage of International Application No. PCT/JP2014/004163 filed on Aug. 22, 2014 and claims priority to Japanese Patent Application No. 2013-207141 filed on Oct. 2, 2013, the disclosure of which is incorporated herein by reference.

BACKGROUND

The present technology relates to a battery, an electrolyte, a battery pack, an electronic device, an electrically-driven vehicle, an electrical storage device, and a power system.

In recent years, there have been many types of portable electronic devices, and their size and weight have been reduced. In order for portable electronic devices to be smaller and lighter, batteries for use as power sources for portable electronic devices have also been required to be smaller, and the accommodation space in portable electronic devices has been required to be used efficiently.

It is known that lithium ion secondary batteries have high energy density and thus are most suitable to satisfy such requirements. For example, lithium ion secondary batteries having a laminated film as their exterior member have been commercialized because such batteries can be manufactured with a light weight and a high energy density and in a very thin shape.

Such batteries having a laminated film as their exterior member are known as polymer batteries, in which a matrix resin and an electrolytic solution held therein are used to form the electrolyte in order for the batteries to have liquid leakage resistance. Such polymer batteries have a significantly improved degree of shape freedom when an aluminum laminated film is used as their exterior member. However, such polymer batteries can have insufficient strength and be easily deformed when a high strength is applied to them due to misuse.

In such a case, if the batteries are covered with a strong exterior pack, there will be no problem. With a recent demand for high capacity, however, simple exterior packs come to be used, which can easily cause a short circuit in batteries when deformed significantly, so that the batteries can be disabled in some cases. To address such a problem, there has been proposed a battery with its electrode surface coated with a ceramic material (see Patent Document 1). There has also been proposed a battery that has a nonaqueous electrolyte containing a dispersed ceramic powder (see Patent Document 2).

CITATION LIST

Patent Documents

Patent Document 1: Japanese Patent Application Laid-Open No. 10-214640
Patent Document 2: Japanese Patent Application Laid-Open No. 2010-198757

SUMMARY

Problems to be Solved by the Invention

Batteries are required to be prevented from having degraded characteristics and to have improved heat dissipation in case of temperature rise.

It is therefore an object of the present technology to provide a battery, an electrolyte, a battery pack, an electronic device, an electrically-driven vehicle, an electrical storage device, and a power system that resist degradation of battery characteristics, have improved heat dissipation for internal heat generation, and thus have improved safety.

Solutions to Problems

To solve the problems mentioned above, the present technology is directed to a battery including: electrodes including a positive electrode and a negative electrode; and a particle-containing insulating part that is provided between the positive electrode and the negative electrode and includes particles and a resin, wherein the particles are a material capable of undergoing an endothermic dehydration reaction and have a flat shape with an aspect ratio of 2/1 or more.

The present technology is also directed to an electrolyte including particles, an electrolytic solution, and a resin, wherein the particles are a material capable of undergoing an endothermic dehydration reaction and have a flat shape with an aspect ratio of 2/1 or more.

The present technology is also directed to a battery pack, an electronic device, an electrically-driven vehicle, an electrical storage device, and a power system each including the battery stated above.

Effects of the Invention

The present technology makes it possible to prevent degradation of battery characteristics, to improve heat dissipation for internal heat generation, and thus to improve safety.

Additional features and advantages are described herein, and will be apparent from the following Detailed Description and the figures.

BRIEF DESCRIPTION OF THE FIGURES

FIGS. 7A-C are a development view showing the structure of the battery cell in the battery pack shown in FIG. 5.

FIG. 8 is a cross-sectional view showing the structure of the battery cell in the battery pack shown in FIG. 5.

FIG. 9 is an exploded perspective view showing an example of the structure of a simple battery pack.

FIG. 15A is an SEM photograph showing part of the region of FIG. 14A in an enlarged manner. FIG. 15B is an SEM photograph showing part of the region of FIG. 14B in an enlarged manner.

FIG. 16 is a chart showing the X-ray diffraction patterns of samples 1 to 3.

DETAILED DESCRIPTION

Hereinafter, embodiments of the present technology will be described with reference to the drawings. Descriptions will be provided in the following order.

1. First Embodiment (example of nonaqueous electrolyte)
2. Second Embodiment (first and second examples of battery)
3. Third Embodiment (first and second examples of battery pack)
4. Fourth Embodiment (example of battery pack)
5. Fifth Embodiment (examples of electrical storage system and others)
6. Other Embodiments (variations)

It will be understood that the embodiments and aspects described below are mere preferred examples of the present technology and are not intended to limit the concepts of the present technology. The advantageous effects described herein are only by way of illustration and should not be construed as limiting effects or denying other effects than the illustrated effects.

1. First Embodiment

Example of the Feature of Nonaqueous Electrolyte

Figure 1:
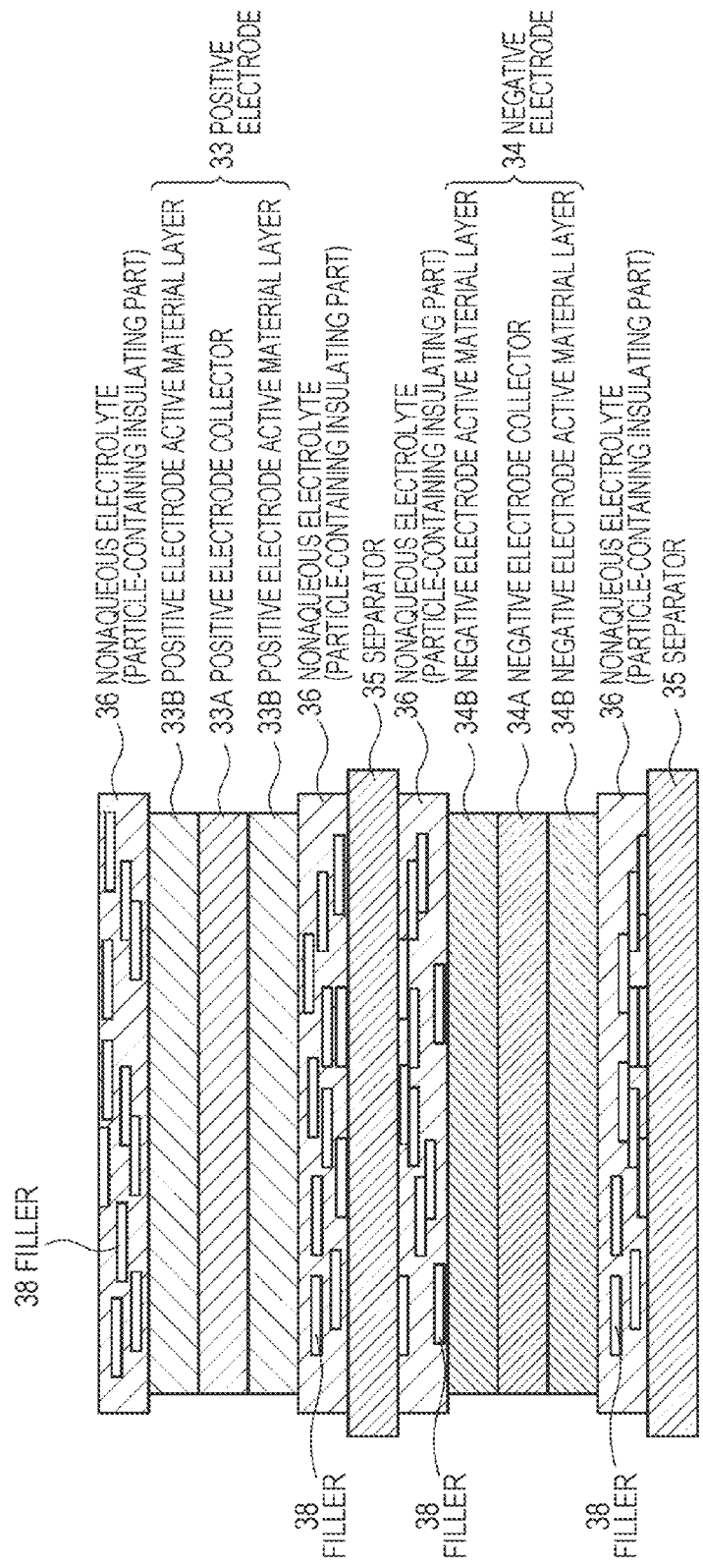
FIG. 1 is a schematic cross-sectional view showing an example of the nonaqueous electrolyte of the present technology.

A description will be given of an example of the feature of a nonaqueous electrolyte (electrolyte) according to a first embodiment of the present technology. FIG. 1 is a schematic cross-sectional view showing the feature of an example of the nonaqueous electrolyte of the present technology. FIG. 1 also shows an example of the schematic structure of a battery including the nonaqueous electrolyte.

The battery of FIG. 1 includes a positive electrode 33, a negative electrode 34, separators 35, and nonaqueous electrolytes 36. The positive electrode 33 includes a positive electrode collector 33A and positive electrode active material layers 33B formed on both surfaces of the positive electrode collector 33A. The negative electrode 34 includes a negative electrode collector 34A and negative electrode active material layers 34B formed on both surfaces of the negative electrode collector 34A. The separator 35 is provided between the positive and negative electrodes 33 and 34 to separate the positive and negative electrodes 33 and 34 from each other. The nonaqueous electrolytes 36 are provided, for example, to be in contact with the positive and negative electrodes 33 and 34, respectively. Alternatively, although not shown, the nonaqueous electrolytes 36 provided on both sides of the positive electrode 33 in FIG. 1 may be omitted, and the nonaqueous electrolytes 36 may be provided to be in contact only with the negative electrode 34. Alternatively, in FIG. 1, the nonaqueous electrolytes 36 provided on both sides of the negative electrode 34 may be omitted, and the nonaqueous electrolytes 36 may be provided to be in contact only with the positive electrode 33.

(Nonaqueous Electrolyte)

The nonaqueous electrolyte 36 includes a nonaqueous solvent, an electrolyte salt, a resin (matrix resin), and a filler 38. In the nonaqueous electrolyte 36, for example, an electrolytic solution (the nonaqueous solvent and the electrolyte salt) is infiltrated and held in the matrix resin. The nonaqueous electrolyte 36 is, for example, an ion conducting gel containing the filler 38, in which the electrolytic solution causes the matrix resin to swell and form the gel. The nonaqueous electrolyte 36 is also a particle-containing insulating part (particle-containing insulating layer) that contains the filler 38 and the resin and is provided between the positive and negative electrode 33 and 34 to insulate the positive and negative electrodes 33 and 34 from each other, together with the separator 35. The separator 35 may be omitted from the structure. In this case, the nonaqueous electrolyte 36, which is located between the positive and negative electrodes 33 and 34, serves as a particle-containing insulating part to singly insulate the positive and negative electrodes 33 and 34 from each other.

(Nonaqueous Solvent)

The nonaqueous solvent may be any of various high-permittivity solvents or low-viscosity solvents. Preferred examples of the high-permittivity solvent include, but are not limited to, ethylene carbonate and propylene carbonate. Examples of the high-permittivity solvent also include butylene carbonate, vinylene carbonate, 4-fluoro-1,3-dioxolan-2-one (fluoroethylene carbonate), 4-chloro-1,3-dioxolan-2-one (chloroethylene carbonate), trifluoromethylethylene carbonate, and other cyclic carbonates. A lactone such as γ-butyrolactone or γ-valerolactone, a lactam such as N-methylpyrrolidone, a cyclic carbamate such as N-methyloxazolidinone, or a sulfone compound such as tetramethylene sulfone may also be used as the high-permittivity solvent instead of or in combination with the cyclic carbonate.

Examples of the low-viscosity solvent include chain carbonates such as dimethyl carbonate, ethyl methyl carbonate, diethyl carbonate, and methyl propyl carbonate; chain carboxylates such as methyl acetate, ethyl acetate, methyl propionate, ethyl propionate, methyl butyrate, methyl isobutyrate, methyl trimethylacetate, and ethyl trimethylacetate; chain amides such as N,N-dimethylacetamide; chain carbamates such as methyl N,N-diethylcarbamate and ethyl N,N-diethylcarbamate; and ethers such as 1,2-dimethoxyethane, tetrahydrofuran, tetrahydropyran, and 1,3-dioxolane.

These high-permittivity solvents and low-viscosity solvents may be used alone, or any mixture of two or more of them may be used.

The content of the nonaqueous solvent is preferably from 70% by mass to 98% by mass based on the mass of the electrolytic solution. If the content is less than 70% by mass, the viscosity may increase excessively. If the content is more than 98% by mass, a sufficient level of conductivity may fail to be attained.

(Electrolyte Salt)

The electrolyte salt may be of any type capable of being dissolved or dispersed in the nonaqueous solvent to form an ion. Lithium hexafluorophosphate ($LiPF_6$) is preferably used as the electrolyte salt. It will be understood that this is a non-limiting example. Examples that may also be used include inorganic lithium salts such as lithium tetrafluorophosphate ($LiBF_4$), lithium hexafluoroarsenate, ($LiAsF_6$), lithium hexafluoroantimonate ($LiSbF_6$), lithium perchlorate ($LiClO_4$), and lithium tetrachloroaluminate ($LiAlCl_4$); and lithium salts of perfluoroalkanesulfonic acid derivatives, such as lithium trifluoromethanesulfonate ($LiCF_3SO_3$), lithium bis(trifluoromethanesulfone)imide ($LiN(CF_3SO_2)_2$), lithium bis(pentafluoroethanesulfone)methide ($LiC(C_2F_5SO_2)_2$), and lithium tris(trifluoromethanesulfone)methide ($LiC(CF_3SO_2)_3$). These salts may be used alone, or any mixture of two or more of them may be used. The content of the electrolyte salt is preferably from 10% by mass to 30% by mass based on the mass of the electrolytic solution. If the content is less than 10% by mass, a sufficient level of conductivity may fail to be attained. If the content is more than 30% by mass, the viscosity may increase excessively.

(Matrix Resin)

The matrix resin may of any type as long as the electrolytic solution (the nonaqueous solvent and the electrolyte salt) and the filler 38 can be infiltrated and held in it. Preferred examples of the material constituting the matrix resin include polymers, specifically, homopolymers, copolymers, and multi-component copolymers including vinylidene fluoride, hexafluoropropylene, polytetrafluoroethylene, and the like. Specific examples include polyvinylidene fluoride (PVdF), polyvinylidene fluoride-hexafluoropropylene copolymers (PVdF-HFP), and polyvinylidene fluoride-hexafluoropropylene-chlorotrifluoroethylene copolymers (PVdF-HEP-CTFE). When impregnated with or allowed to hold the nonaqueous solvent and the electrolyte salt, some matrix resins can be allowed to swell and turned into a gel or a non-fluid state. This makes it possible to suppress the leakage of the nonaqueous electrolyte 36 from the battery.

The content of the matrix resin is preferably from 2% by mass to 15% by mass based on the mass of the nonaqueous electrolyte 36. If the matrix resin content is less than 2% by mass, the nonaqueous electrolyte may fail to form a gel. If the matrix resin content is more than 15% by mass, there may be an effect on the battery characteristics, such as a reduction in energy density.

(Filler)

The filler 38 is a material capable of undergoing an endothermic dehydration reaction to form water (a material capable of undergoing a dehydration reaction), and particles, such as inorganic particles, having a flat shape with an aspect ratio of 2/1 or more may be used as the filler 38. The material capable of undergoing an endothermic dehydration reaction to form water functions to suppress an increase in temperature by undergoing an endothermic dehydration reaction to absorb heat upon the increase in temperature. The particles having a flat shape with an aspect ratio of 2/1 or more can be stable in the battery, have no adverse effect on the battery reaction, and have a high level of electrically insulating properties and thermal conductivity.

The term "particles having a flat shape with an aspect ratio of 2/1 or more" refers to particles having a flat shape with a ratio of its long side to its short side (long side/short side) of 2/1 or more. This value can be determined from, for example, an enlarged photograph of the particles taken with a scanning electron microscope (SEM). In practical view, the aspect ratio is preferably from 2/1 to 400/1.

For example, the aspect ratio can be typically determined as described below. A predetermined number of particles (primary particles) in the nonaqueous electrolyte 36 are randomly selected and then each three-dimensionally observed with a scanning electron microscope. In this process, the aspect ratio (long side/short side) of each particle is determined from the short side of the flat shape (the length of the shortest part in the thickness direction) and the length of the longest part (long side) of the area (surface) perpendicular to the thickness direction. The average of the resulting ratios is calculated as the aspect ratio.

The endothermic dehydration reaction occurs preferably at a temperature of 160° C. or higher, more preferably 160° C. to 900° C., even more preferably 400° C. to 900° C. If the endothermic dehydration reaction occurs at a temperature of lower than 160° C., the produced water may be unstable and react with the electrolyte to affect the battery characteristics. If the endothermic dehydration reaction occurs at a temperature of higher than 900° C., the dehydration-induced endothermic effect will tend not to be produced during the operation of the battery, which will tend to reduce the advantageous effect.

The temperature at which the endothermic dehydration reaction occurs can be measured, for example, as described below. The battery is disintegrated, and the resulting electrode is washed with a solvent such as dimethyl carbonate (DMC). In this process, the electrolyte component is separated from the coating on the electrode surface. The solution obtained by separating the electrolyte component is centrifuged so that the filler component (filler 38) is obtained. Using a thermogravimetric analyzer (TG/DTA6300 manufactured by Seiko Instruments Inc.), the filler component is then heated to 1,000° C. at a rate of 10° C./minute, in which the temperature at which the endothermic dehydration reaction occurs can be determined from the temperature at which a weight loss occurs.

Examples of the inorganic particles of the material capable of undergoing the endothermic dehydration reaction to form water include hydrate particles, metal hydroxide particles, and particles of a mineral. One type of these particles may be used alone, or any mixture of two or more types of these particles may be used.

The hydrate is preferably a hydrate of a sulfate such as magnesium sulfate ($MgSO_4$), calcium sulfate ($CaSO_4$), barium surface ($BaSO_4$), or strontium sulfate ($SrSO_4$).

The metal hydroxide is preferably AlOOH (boehmite, $Al_2O_3H_2O$), magnesium hydroxide ($Mg(OH)_2$, brucite), aluminum hydroxide ($Al(OH)_3$ (bayerite, gibbsite)), zinc hydroxide ($Zn(OH)_2$), or any other hydrated hydroxide, oxidized hydroxide, or hydrated oxide.

The particles of a mineral (mineral particles) are typically particles of a clay mineral (clay mineral particles). The clay mineral may be a crystalline clay mineral, an amorphous or quasicrystalline clay mineral, or the like. Examples of the crystalline clay mineral include silicate minerals such as lamellar silicate (phyllosilicate) minerals, minerals with a structure close to that of lamellar silicate, and other silicate minerals; and lamellar carbonate minerals.

Lamellar silicate minerals have a Si—O tetrahedral sheet and an octahedral sheet of Al—O, Mg—O, or the like combined with the tetrahedral sheet. Lamellar silicates are typically classified according to the number of tetrahedral and octahedral sheets, the number of octahedral cations, and the layer charge. Minerals derived from lamellar silicate minerals by entirely or partially replacing the interlayer metal ions with organic ammonium ions or the like may also be used.

Specific examples of lamellar silicate minerals include those belonging to the 1:1 kaolinite-serpentine group, the 2:1 pyrophyllite-talc group, the smectite group, the vermiculite group, the mica (isinglass) group, the brittle mica group, and the chlorite group.

Lamellar silicate minerals belonging to the kaolinite-serpentine group include, for example, chrysotile, antigorite, lizardite, kaolinite, and dickite. Lamellar silicate minerals belonging to the pyrophyllite-talc group include, for example, talc ($Mg_3Si_4O_{10}(OH)_2$), willemseite, and pyrophyllite ($Al_2Si_4O_{10}(OH)_2$). Lamellar silicate minerals belonging to the smectite group include, for example, saponite [$(Ca/2,Na)_{0.33}(Mg,Fe^{2+})_3(Si,Al)_4O_{10}(OH)_2 \cdot 4H_2O$], hectorite, sauconite, montmorillonite {$(Na,Ca)_{0.33}(Al,Mg)_2Si_4O_{10}(OH)_2 \cdot nH_2O$, clay composed mainly of montmorillonite is called bentonite}, beidellite, and nontronite. Lamellar silicate minerals belonging to the mica (isinglass) group include, for example, sericite, phlogopite (magnesia mica), biotite, and lepidolite (lithia mica). Lamellar silicate minerals belonging to the brittle mica group include, for example, margarite, clintonite, and anandite. Lamellar silicate minerals belonging to the chlorite group include, for example, cookeite, sudoite, clinochlore, chamosite, and nimite.

Examples of the mineral with a structure close to that of lamellar silicate include hydrous magnesium silicates with a 2:1 ribbon structure (that is, tetrahedron:octahedral=2:1) in which tetrahedral sheets adjacent to each other are arranged in a ribbon shape and joined with alternating tops and bottoms. Hydrous magnesium silicates include sepiolite (sea foam, $Mg_9Si_{12}O_{30}(OH)_6(OH_2)_4 \cdot 6H_2O$) and palygorskite.

Other silicate minerals include porous aluminosilicates such as zeolite ($M_{2/n}O \cdot Al_2O_3 \cdot xSiO_2 \cdot yH_2O$, M is a metal element, $x \geq 2$, $y \geq 0$) and attapulgite [$(Mg,Al)_2Si_4O_{10}(OH) \cdot 6H_2O$].

Lamellar carbonate minerals include hydrotalcite ($Mg_6Al_2(CO_3)(OH)_{16} \cdot 4(H_2O)$).

Examples of the amorphous or quasicrystalline clay mineral include hisingerite, imogolite, and allophane.

Other mineral particles may be of any type capable of undergoing an endothermic dehydration reaction to form water. The mineral particles may be made of a natural mineral or an artificial mineral.

(State of Orientation of Filler)

The filler 38 is preferably oriented parallel to the electrode surface. The state in which the filler 38 (flat-shaped particles) is oriented parallel to the electrode surface refers to a state in which the thickness directions of flat-shaped particles (filler 38) in the nonaqueous electrolyte 36 are substantially aligned parallel to the normal of the electrode surface. The term "parallel" is intended to also include "substantially parallel."

For example, the state of the orientation of the flat-shaped particles (filler 38) in the nonaqueous electrolyte 36 can be typically determined by observing the cross-section of the battery with a scanning electron microscope. For example, an SEM image is obtained by observing part of the cross-section of the battery. In the SEM image, the angle of the thickness direction of the flat-shaped particle with respect to the normal of the electrode surface as a reference line is determined for each of a predetermined number of particles (primary particles) in a region from at least one surface of the separator to 3 μm depth. When the angle is 0° to 30° for 70% (by number) or more of the particles in the region from at least one surface of the separator to 3 μm depth, the flat-shaped particles (filler 38) are determined to be oriented parallel to the electrode surface. When the separator is omitted from the structure, a region from the surface on which the particle-containing part is formed, such as the electrode surface, to 3 μm depth may be used instead of the above region.

When the filler 38 is oriented parallel to the electrode surface, the particles are more likely to be connected with one another in a direction (in-plane direction) parallel to the electrode surface but less likely to be connected with one another in the vertical direction (the direction perpendicular to the in-plane direction). Therefore, for example, heat generated from the electrode is more likely to be dissipated uniformly in the in-plane direction but less likely to be dissipated in the direction perpendicular to the in-plane direction. In other words, the nonaqueous electrolyte 36 containing the filler 38 has thermal conduction anisotropy in which the thermal conductivity in the direction perpendicular to the electrode surface is lower than that in the direction parallel to the electrode surface, which can further improve the thermal insulation properties between different electrodes.

The state of the orientation can be identified from an X-ray diffraction pattern of the nonaqueous electrolyte 36 disposed on the electrode, depending on the type of the filler 38 material. For example, when the filler 38 is talc, the filler 38 (talc) is used in such a way that the (006) plane is oriented in a direction parallel to the electrode surface. Therefore, a crystal plane not parallel thereto, such as the (132) plane, has a relatively low diffraction peak intensity. Therefore, when the peak intensity ratio (the diffraction peak intensity of the (006) plane/the diffraction peak intensity of the (132) plane) is from 10 to 1,000, the filler 38 can be determined to be oriented parallel to the electrode surface.

(Content Ratio of Filler to Matrix Resin)

The content ratio of the filler 38 (particles) to the matrix resin (the mass ratio (the particles)/(the matrix resin)) is typically, for example, 1/1 to 25/1, preferably 1/1 to 5/1. If the content ratio is less than 1/1, the addition of the inorganic particles will tend to be less effective. If the content ratio is more than 5/1, the battery characteristics such as the cycle characteristics will tend to decrease.

Advantageous Effects

When used in batteries, the nonaqueous electrolyte of the present technology described above can suppress the degradation of the characteristics of the batteries and improve the heat dissipation for the internal heat generation. In the battery described in Patent Document 1 (Japanese Patent Application Laid-Open No. 10-214640) mentioned in the BACKGROUND ART section, for example, the strength (load) can be kept high until a short circuit occurs, but the ability to impregnate the electrode with an electrolytic solution can easily decrease, so that the battery characteristics can decrease.

In the battery described in Patent Document 2 (Japanese Patent Application Laid-Open No. 2010-198757) mentioned in the BACKGROUND ART section, the strength against a short circuit and the ability to impregnate the electrode with an electrolytic solution are improved, but the heat dissipation is insufficient for an increase in temperature in some cases.

When the flat-shaped particles are oriented, the nonaqueous electrolyte of the present technology can be formed so as to have improved coatability on the electrode and to be thin. The flat-shaped filler particles have higher insulating properties between electrodes than other fine particles and can prevent a short circuit between the positive and negative electrodes even when contamination occurs. This can improve the safety.

Even when a short circuit occurs so that heat is generated by a local short circuit of the negative electrode, the nonaqueous electrolyte of the present technology can suppress the conduction of the heat from the negative electrode to the positive electrode due to the thermal conduction anisotropy and also can dissipate the heat due to the thermal conduction in the direction parallel to the electrode, so that the local increase in temperature can be prevented from leading to thermal runaway. This can improve the safety.

Also when the battery generates heat and reaches a high temperature due to a short circuit between the electrodes, exposure to a high-temperature environment, or a short circuit in the battery causing a large current to flow, the filler in the nonaqueous electrolyte undergoes an endothermic dehydration reaction to suppress the increase in temperature caused by the heat generation. This can improve the safety.

2. Second Embodiment

A description will be given of a nonaqueous electrolyte battery (battery) according to a second embodiment of the present technology. The nonaqueous electrolyte battery according to the second embodiment of the present technology is a laminated film-type nonaqueous electrolyte battery containing the nonaqueous electrolyte according to the first embodiment. This nonaqueous electrolyte battery is, for example, a chargeable and dischargeable nonaqueous electrolyte secondary battery such as a lithium-ion secondary battery. Hereinafter, two examples (first and second examples) of the structure of the laminated film-type nonaqueous electrolyte secondary battery will be described.

(2-1) First Example

Structure of Nonaqueous Electrolyte Secondary Battery

Figure 2:
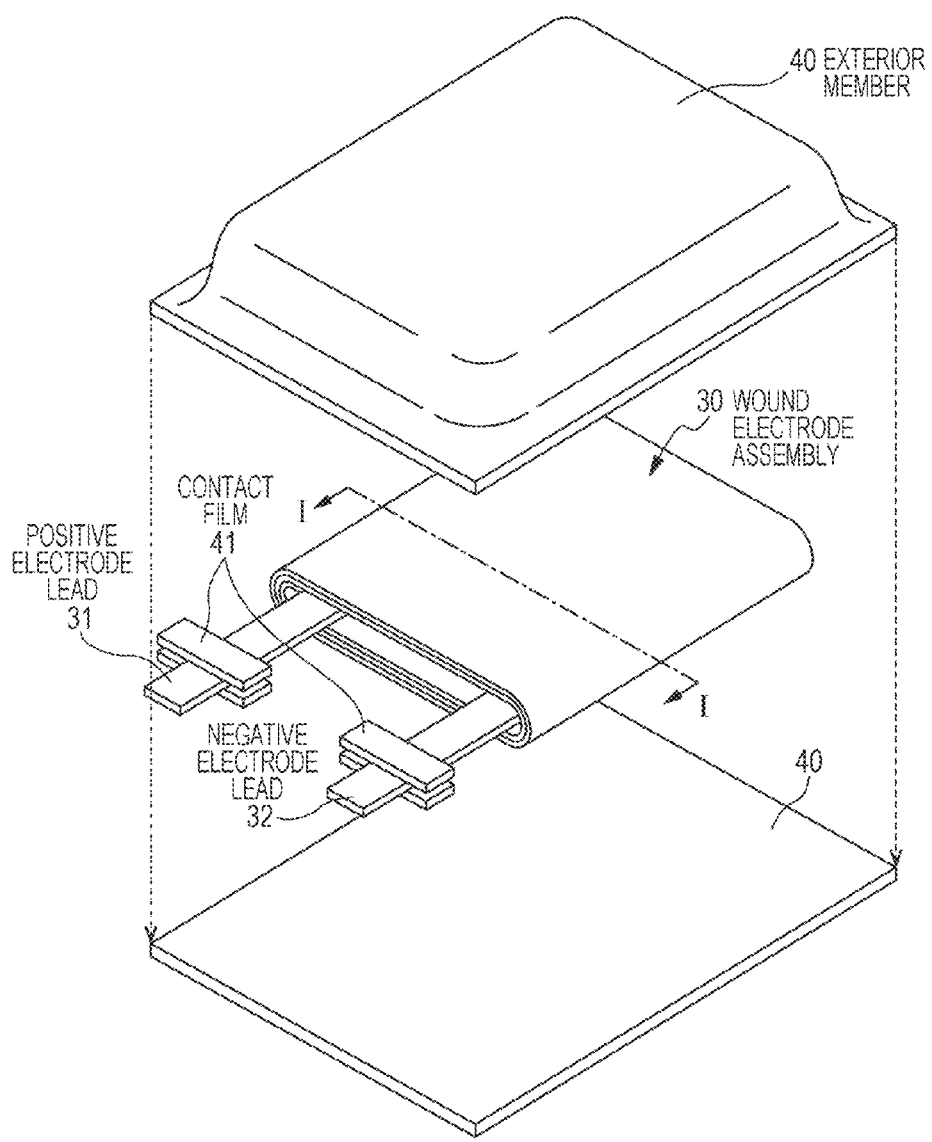
FIG. 2 is an exploded perspective view showing an example of the nonaqueous electrolyte secondary battery of the present technology.

A first example of the nonaqueous electrolyte secondary battery will be described. FIG. 2 is an exploded perspective view showing a first example of the laminated nonaqueous electrolyte secondary battery of the present technology. As shown in FIG. 2, the secondary battery includes a wound electrode assembly 30 and a film-shaped exterior member 40, in which a positive electrode lead (positive electrode terminal) 31 and a negative electrode lead (negative electrode terminal) 32 are attached to the wound electrode assembly 30, and the wound electrode assembly 30 is sealed in the exterior member 40. The positive electrode lead 31 and the negative electrode lead 32 are provided to extend from inside to outside the exterior member 40, for example, in the same direction. The positive and negative electrode leads 31 and 32 are made of, for example, a metal material such as aluminum (Al), copper (Cu), nickel (Ni), or stainless steel.

The exterior member 40 includes a rectangular laminated film including, for example, a nylon film, an aluminum foil, and a polyethylene film laminated in this order. The exterior member 40 is disposed, for example, in such a way that the polyethylene film side faces the wound electrode assembly 30. The respective peripheries of the films are fused or bonded together with an adhesive.

A contact film 41 for preventing the infiltration of air from the outside is provided between the exterior member 40 and the positive and negative electrode leads 31 and 32. The contact film 41 is made of a material capable of being in close contact with the positive and negative electrode leads 31 and 32. For example, when the positive and negative electrode leads 31 and 32 are each made of the metal material mentioned above, the contact film 41 is preferably made of a polyolefin resin such as polyethylene, polypropylene, modified polyethylene, or modified polypropylene.

Alternatively, the exterior member 40 may include another structure such as a metal material-free laminated film, a film of a polymer such as polypropylene, or a metal film, instead of the above laminated film.

In general, the laminated film may have a multilayer structure represented by exterior layer/metal foil/sealant layer (in which the exterior layer and the sealant layer may each have a multilayer structure). In the above example, the nylon film, the aluminum foil, and the polyethylene film correspond to the exterior layer, the metal foil, and the sealant layer, respectively.

The metal foil only has to function as a barrier film with resistance to moisture permeation. Therefore, the metal foil may be not only an aluminum foil but also any of a stainless steel foil, a nickel foil, and a plated iron foil. However, the aluminum foil is preferably used because of its light weight and high workability.

Examples of the structure (exterior layer/metal foil/sealant layer) of the exterior member that may be used include Ny (nylon)/Al (aluminum)/CPP (unstretched polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low-density polyethylene), PET/PE/Al/PET/LDPE (low-density polyethylene), and PET/Ny/Al/LDPE/CPP.

(Structure of Wound Electrode Assembly)

Figure 3:
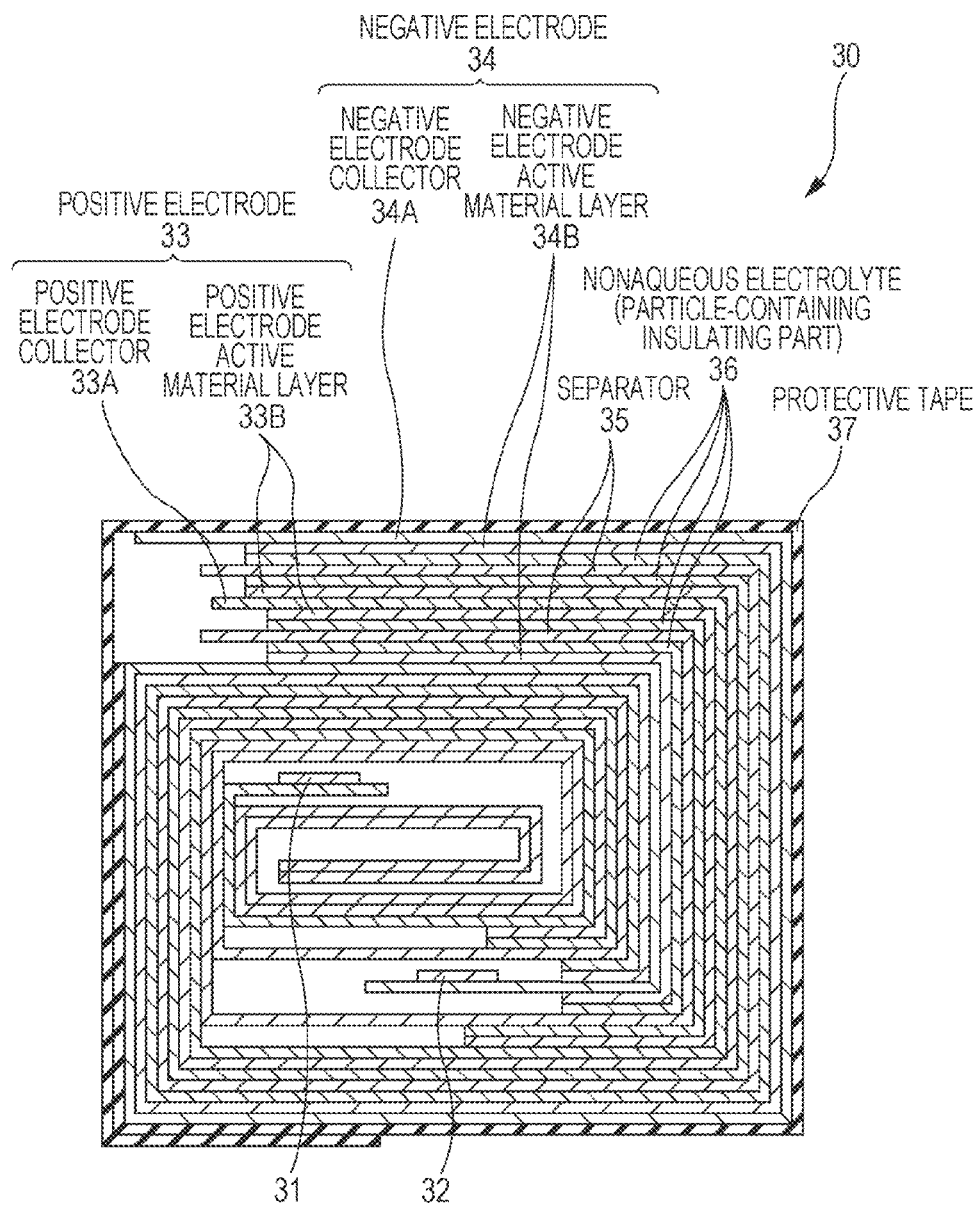
FIG. 3 is a cross-sectional view along the I-I line of a wound electrode assembly shown in FIG. 2.

FIG. 3 is a schematic cross-sectional view along the I-I line of the wound electrode assembly 30 shown in FIG. 2. In FIG. 3, the wound electrode assembly 30 includes positive and negative electrodes 33 and 34, a nonaqueous electrolyte 36, a separator 35, and a protective tape 37, in which the positive and negative electrodes 33 and 34 are wound and opposed to each other with the nonaqueous electrolyte 36 and the separator 35 interposed therebetween, and the outermost periphery is protected by the protective tape 37. The nonaqueous electrolyte 36 is the same as that of the first embodiment. Specifically, the nonaqueous electrolyte 36 includes a nonaqueous solvent, an electrolyte salt, a matrix resin, and a filler 38 (not shown) as in the first embodiment.

(Positive Electrode)

The positive electrode 33 has a structure including, for example, a positive electrode collector 33A with a pair of opposed surfaces and a positive electrode active material layer or layers 33B formed on one or both surfaces of the positive electrode collector 33A, in which one or both surfaces of the positive electrode collector 33A are covered with the positive electrode active material layer or layers 33B. The positive electrode collector 33A has an exposed part (not coated with the positive electrode active material layer 33B) at one longitudinal end, and the positive electrode lead 31 is attached to the exposed part.

The positive electrode collector 33A includes, for example, a metal foil such as an aluminum foil, a nickel foil, or a stainless steel foil.

The positive electrode active material layer 33B includes, as a positive electrode active material or materials, one or more positive electrode materials capable of storing and releasing lithium ions, and, if necessary, may contain a conductive agent and a binder.

Examples of positive electrode materials capable of storing and releasing lithium ions include oxides such as vanadium oxide ($V_2O_5$), titanium dioxide ($TiO_2$), and manganese dioxide ($MnO_2$); sulfur (S); disulfides such as iron disulfide ($FeS_2$), titanium disulfide ($TiS_2$), and molybdenum disulfide ($MoS_2$); lithium-free chalcogenides such as niobium diselenide ($NbSe_2$) (particularly, layered compounds and spinel compounds); lithium-containing compounds; and conductive polymer compounds such as polyaniline, polythiophene, polyacetylene, and polypyrrole.

Among these materials, lithium-containing compounds are preferred because some of them can provide high voltages and energy densities. Examples of such lithium-containing compounds include complex oxides containing lithium and a transition metal element, and phosphoric acid compounds containing lithium and a transition metal element. In terms of providing higher voltages, these compounds preferably contain cobalt (Co), nickel (Ni), manganese (Mn), iron (Fe), copper (Cu), zinc (Zn), chromium (Cr), vanadium (V), titanium (Ti), or any mixture thereof.

Such lithium-containing compounds may be compounds represented by formula (1) or (2) below. Compounds of formula (1) generally have a layered structure, and compounds of formula (2) generally have an olivine structure.

$$Li_rMIO_2 \quad (1)$$

$$Li_sMIIPO_4 \quad (2)$$

In the formulae (1) and (2), MI and MII each represent at least one transition metal element, and r and s are values generally satisfying $0.05 \leq r \ 1.10$ and $0.05 \leq s \leq 1.10$ although they vary with the state of charge or discharge of the battery.

Examples of the complex oxides containing lithium and a transition metal element include lithium cobalt complex oxide ($LiCoO_2$), lithium nickel complex oxide ($LiNiO_2$), and solid solutions thereof ($Li(Ni_tCo_uMn_v)O_2$ ($0<t<1$, $0<u<1$, $0<v<1$, $t+u+v=1$)); lithium nickel cobalt complex oxide ($LiNi_{1-w}Co_wO_2$ ($0<w<1$)), lithium manganese complex oxide ($LiMn_2O_4$) of a spinel structure, and solid solutions thereof ($Li(Mn_{2-x}Ni_y)O_4$ ($0<x<2$, $0<y<2$)).

Examples of the phosphoric acid compounds containing lithium and a transition metal element include a lithium iron phosphate compound ($LiFePO_4$) and a lithium iron manganese phosphate compound ($LiFe_{1-z}Mn_zPO_4$ ($0<z<1$)), which have an olivine structure.

The conductive agent may be of any type capable of imparting electrical conductivity when mixed in an appropriate amount with the positive electrode active material. Examples of the conductive agent include carbon materials such as graphite, carbon black, and ketjen black. One or a mixture of two or more of these materials may be used. Besides the carbon materials, any other conductive material such as a metal material or a conductive polymer material may also be used.

The binder may be a known binder commonly used in a positive electrode mixture for this type of battery. Preferred examples include fluoropolymers such as polyvinyl fluoride, polyvinylidene fluoride, and polytetrafluoroethylene; and synthetic rubbers such as styrene butadiene rubbers, fluororubbers, and ethylene propylene diene rubbers. One or a mixture of two or more of these materials may be used.

(Negative Electrode)

Like the positive electrode 33, the negative electrode 34 has a structure including, for example, a negative electrode collector 34A with a pair of opposed surfaces and a negative electrode active material layer or layers 34B formed on one or both surfaces of the negative electrode collector 34A, in which one or both surfaces of the negative electrode collector 34A are covered with the negative electrode active material layer or layers 34B. The negative electrode collector 34A has an exposed part (not provided with the negative electrode active material layer 34B) at one longitudinal end, and the negative electrode lead 32 is attached to the exposed part.

The negative electrode collector 34A includes, for example, a metal foil such as a copper foil, a nickel foil, or a stainless steel foil.

The negative electrode active material layer 34B includes, as a negative electrode active material or materials, one or more of metallic lithium and a negative electrode material capable of storing and releasing lithium ions, and, if necessary, may contain a conductive agent and a binder.

Examples of the negative electrode material capable of storing and releasing lithium ions include carbon materials, metal oxides, and polymer compounds.

Examples of carbon materials include non-graphitizable carbon materials, artificial graphite materials, and graphite materials, and more specifically include pyrolytic carbons, cokes, graphites, glassy carbons, baking products of organic polymer compounds, carbon fibers, activated carbons, and carbon blacks. Examples of cokes include pitch cokes, needle cokes, and petroleum cokes. The baking products of organic polymer compounds refer to products obtained by baking polymer materials such phenolic resins and furan resins at appropriate temperatures to form carbon materials.

Examples of metal oxides include iron oxide, ruthenium oxide, and molybdenum oxide. Examples of polymer compounds include polyacetylene and polypyrrole.

Examples of the negative electrode material capable of storing and releasing lithium ions also include materials containing at least one constituent element selected from metal and metalloid elements capable of forming alloys with lithium. The negative electrode material may also be a simple metal or metalloid element, an alloy, a compound, or a material at least partially including one or more of these phases.

In the present technology, the term "alloy" is intended to include not only an alloy composed of two or more metal elements but also a material including one or more metal elements and one or more metalloid elements. Such a material may also include a nonmetallic element or elements. The structure of the alloy may include a solid solution, a eutectic (eutectic mixture), an intermetallic compound, or a mixture of two or more thereof.

Examples of such metal or metalloid elements include tin (Sn), lead (Pb), magnesium (Mg), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among them, metal or metalloid elements belonging to group 14 of the long form of the periodic table are preferred, and silicon and tin are particularly preferred. Silicon and tin have a high ability to store and release lithium and thus can provide high energy density.

Examples of the tin alloy include alloys including tin and at least one selected from the group consisting of silicon, magnesium, nickel, copper, iron, cobalt, manganese, zinc, indium, silver, titanium, germanium, bismuth, antimony, and chromium (Cr), as a second constituent element other than tin.

Examples of the silicon alloy include alloys including silicon and at least one selected from the group consisting of tin, magnesium, nickel, copper, iron, cobalt, manganese, zinc, indium, silver, titanium, germanium, bismuth, antimony, and chromium, as a second constituent element other than silicon.

The tin compound or the silicon compound may contain, for example, oxygen (O) or carbon (C), and may also contain the second constituent element listed above in addition to tin or silicon. The negative electrode material may also be an element capable of forming a complex oxide with lithium, such as titanium. As a matter of course, metallic lithium may be deposited and dissolved, or magnesium or aluminum other than lithium may also be deposited and dissolved. The conductive agent and the binder may be the same as those used in the positive electrode.

(Separator)

The separator 35 includes an insulating thin film having high ion permeability and a desired level of mechanical strength, such as a porous film made of a polyolefin synthetic resin such as polypropylene or polyethylene; or a porous film made of an inorganic material, such as a ceramic nonwoven fabric. The separator may also have a structure in which two or more of these porous films are stacked. In particular, a separator including a polyolefin porous film is preferred because it has a high ability to separate the positive and negative electrodes 33 and 34 from each other and can further reduce the risk of an internal short circuit or a decrease in open-circuit voltage.

[Method for Manufacturing Nonaqueous Electrolyte Secondary Battery]

A description will be given of an example of a method for manufacturing the nonaqueous electrolyte secondary battery described above. First, the positive electrode 33 is prepared. For example, when the positive electrode active material used is in the form of particles, the positive electrode active material is optionally mixed with a conductive agent and a binder to form a positive electrode mixture, which is then dispersed in a dispersion medium such as N-methyl-2-pyrrolidone to form a positive electrode mixture slurry. Subsequently, the positive electrode mixture slurry is applied to the positive electrode collector 33A, dried, and shaped by compression to form the positive electrode active material layer 33B.

The negative electrode 34 is also prepared. For example, when the negative electrode active material used is in the form of particles, the negative electrode active material is optionally mixed with a conductive agent and a binder to form a negative electrode mixture, which is then dispersed in a dispersion medium such as N-methyl-2-pyrrolidone to form a negative electrode mixture slurry. Subsequently, the negative electrode mixture slurry is applied to the negative electrode collector 34A, dried, and shaped by compression to form the negative electrode active material layer 34B.

A nonaqueous electrolyte material for use in forming the nonaqueous electrolyte 36 described above is further prepared. The nonaqueous electrolyte material can be obtained by mixing the nonaqueous solvent, the electrolyte salt, the matrix resin, and the inorganic filler particles (filler 38) and adjusting the viscosity of the mixture to 150 mPa·s or less, preferably 40 mPa·s to 70 mPa·s.

When the viscosity is adjusted to 150 mPa·s or less, the state of the orientation of the inorganic filler particles can be set as desired in the nonaqueous electrolyte 36. If the viscosity is higher than 150 mPa·s, the movement of the inorganic filler particles will be hindered in the nonaqueous electrolyte material layer formed by application, so that the desired orientation state will tend to be difficult to obtain.

If the viscosity is lower than 40 mPa·s, the shape of the end of the electrolyte material can easily become irregular in the process of depositing the electrolyte material on the positive or negative electrode 33 or 34, which will require a reduction in the rate of application. If the shape of the end of the electrolyte material is irregular, a reduction in safety or battery characteristics may occur due to variations in the distance between the electrodes or other defects. If the viscosity is higher than 70 mPa·s, the conductivity may be affected and the battery capacity may decrease. The nonaqueous electrolyte material to be used may further contain a viscosity adjusting solvent.

Such a viscosity adjusting solvent is preferably a solvent capable of evaporating, for example, in the process of depositing the nonaqueous electrolyte 36 on the positive or negative electrode 33 or 34 or any other component. This can prevent the resulting nonaqueous electrolyte 36 from degrading the battery characteristics.

Such a viscosity adjusting solvent may be one capable of serving as the nonaqueous solvent. Examples of such a solvent include dimethyl carbonate and ethyl methyl carbonate.

Subsequently, the positive electrode lead 31 is attached to the positive electrode 33, and the negative electrode lead 32 is attached to the negative electrode 34. Thereafter, the nonaqueous electrolyte material is applied to at least one of the positive and negative electrodes 33 and 34. In this way, a layer of the nonaqueous electrolyte 36 is formed.

The negative electrode 34, the separator 35, the positive electrode 33, and the separator 35 are then sequentially stacked to form a laminate. The laminate is wound, and the protective tape 37 is bonded to the outermost peripheral part of the wound laminate, so that the wound electrode assembly 30 is formed. The wound electrode assembly 30 is sandwiched between laminated films as an example of the exterior member 40, and the outer edges, exclusive of one side, are heat-sealed to form a bag shape. If necessary, the nonaqueous solvent and the electrolyte salt may be added.

Subsequently, the opening between the laminated films is heat-sealed. In this way, the layer of the nonaqueous electrolyte 36 is formed, and the nonaqueous electrolyte secondary battery shown in FIGS. 2 and 3 is completed.

[Description of Operation]

The nonaqueous electrolyte secondary battery described above typically works as follows. During charging, lithium ions are released from the positive electrode active material layer 33B, transported through the nonaqueous electrolyte 36, and stored in the negative electrode active material layer 34B. During discharging, lithium ions are released from the negative electrode active material layer 34B, transported through the nonaqueous electrolyte 36, and stored in the positive electrode active material layer 33B.

(2-2) Second Example

Figure 4A:
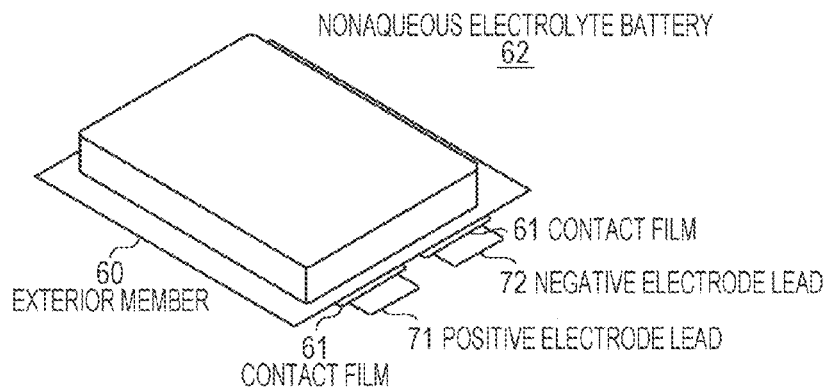
FIGS. 4A-C are an exploded perspective view showing the structure of a laminated film-type nonaqueous electrolyte battery having an electrode laminate.
Figure 4B:
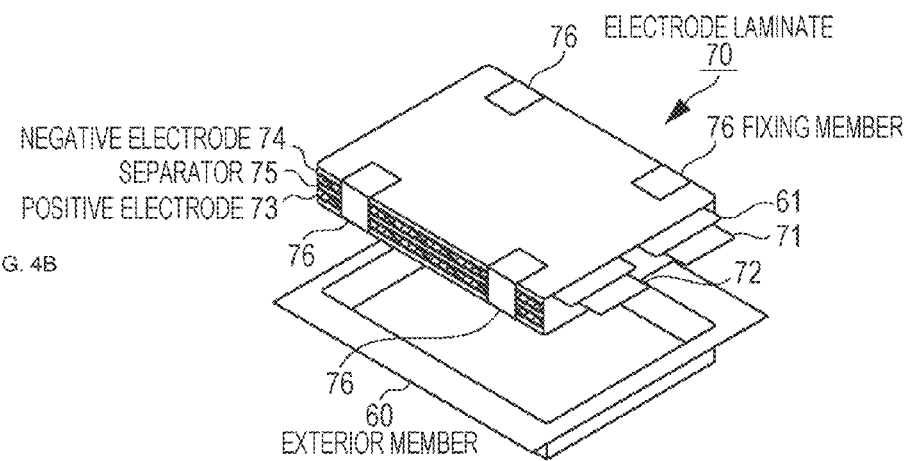
Figure 4C:
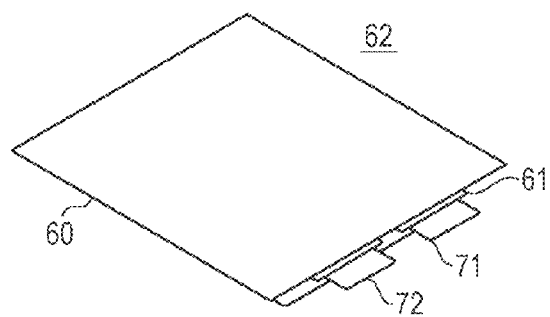

The first example shows the nonaqueous electrolyte secondary battery 62 having the wound electrode assembly 50 sheathed with the exterior member 60. Alternatively, as shown in FIGS. 4A to 4C, an electrode laminate 70 may be used instead of the wound electrode assembly 30. Hereinafter, a description will be given of a second example of the nonaqueous electrolyte secondary battery (battery) according to a third embodiment of the present technology (nonaqueous electrolyte secondary battery 62), in which the electrode laminate 70 is used instead of the wound electrode assembly 30.

FIG. 4A is a perspective view showing an appearance of the nonaqueous electrolyte secondary battery 62 containing the electrode laminate 70. FIG. 4B is an exploded perspective view showing how the electrode laminate 70 is housed in the exterior member 60. FIG. 4C is a perspective view sowing a bottom-side appearance of the nonaqueous electrolyte secondary battery 62 shown in FIG. 4A.

The electrode laminate 70 has rectangular positive and negative electrodes 73 and 74 stacked with a separator 75 interposed therebetween. When used, the electrode laminate 70 is fixed with fixing members 76. Although not shown, the nonaqueous electrolyte is provided in contact with the positive and negative electrodes 73 and 74. For example, the nonaqueous electrolyte (not shown) is provided between the positive electrode 73 and the separator 75 and between the negative electrode 74 and the separator 75. The nonaqueous electrolyte is the same as that according to the first embodiment.

A positive electrode lead 71 is connected to the positive electrode 73 so as to extend from the electrode laminate 70, and a negative electrode lead 72 is connected to the negative electrode 74 so as to extend from the electrode laminate 70. A contact film 61 is provided between the exterior member 60 and the positive and negative electrode leads 71 and 72.

The nonaqueous electrolyte is formed by the same method as for the first example, and the exterior member 60 is heat-sealed by the same method as for the first example.

3. Third Embodiment

Example of Battery Pack

A description will be given of a battery pack according to a third embodiment of the present technology. The battery pack according to the third embodiment of the present technology is a laminated film-type battery pack having the same nonaqueous electrolyte as that according to the first embodiment. Hereinafter, two structural examples (first and second examples) will be described.

(3-1) First Example

A first example of the laminated film-type battery pack according to the third embodiment will be described with reference to the drawings. In the description below of the first example of the battery pack, a product including a wound electrode assembly sheathed with a hard laminated film and a soft laminated film is referred to as a battery cell, and a product including a battery cell, a circuit board connected to the battery cell, and top and bottom covers engaged to the battery cell is referred to as a battery pack. In the battery pack and the battery cell, the side where positive and negative electrode terminals extend is referred to as a top portion, the side opposite to the top portion is referred to as a bottom portion, and two sides other than the top and bottom portions are referred to as side portions. The length in the side-to-side direction is referred to as the width, and the length in the top-to-bottom direction is referred to as the height.

[Structural Example of Battery Pack]

Figure 5:
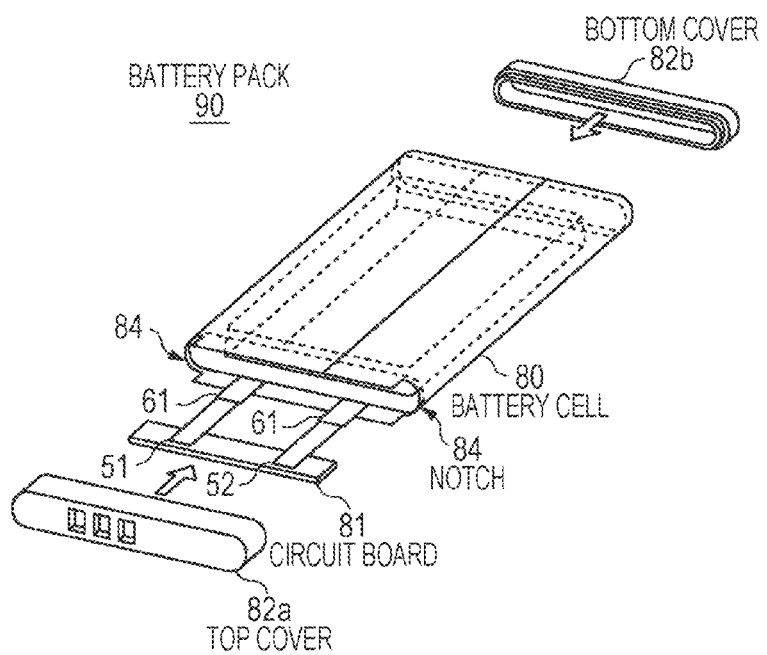
FIG. 5 is an exploded perspective view showing the structure of a battery pack containing a laminate film-type nonaqueous electrolyte battery.
Figure 6:
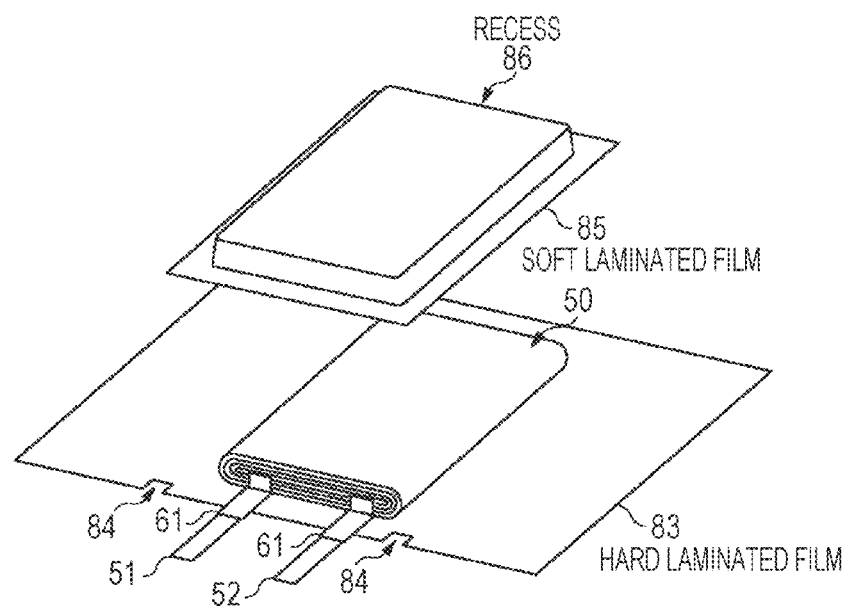
FIG. 6 is an exploded perspective view showing the structure of a battery cell in the battery pack shown in FIG. 5.

FIG. 5 is a perspective view showing an example of the structure of the first example of the battery pack according to the third embodiment. FIG. 6 is an exploded perspective view showing the structure of the battery cell. FIG. 7 includes top and side views showing a state in the process of manufacturing the battery cell according to the third embodiment. FIG. 8 is a cross-sectional view showing the cross-sectional structure of the battery cell.

The battery pack 90 is a nonaqueous electrolyte battery pack having, for example, a square or flat shape. As shown in FIGS. 5 and 6, the battery pack 90 includes a battery cell 80 having openings at both ends and including a wound electrode assembly 50 housed in an exterior component; and top and bottom covers 82a and 82b engaged to the openings at both ends of the battery cell 80, respectively. The wound electrode assembly 50 in the battery pack 90 is the same as the wound electrode assembly 30 of the second embodiment. Positive and negative electrode leads 51 and 52 are connected to the wound electrode assembly 50 and extend from the heat-sealed portion of the exterior component to the outside of the battery cell 80 through a contact film 61. The positive and negative electrode leads 51 and 52 are also connected to a circuit board 81.

As shown in FIGS. 6 and 7, the exterior component is sheet-shaped as a whole. The exterior component includes a hard laminated film 83, which is rectangular when viewed from above, and a soft laminated film 85, which is of a rectangular shape with a side-to-side direction length shorter than that of the hard laminated film 83. The openings at both ends of the battery cell 80 are rectangular as a whole. Both short sides of each opening bulge outwards to form elliptical arcs.

The battery cell 80 includes the soft laminated film 85 formed with a recess 86; the wound electrode assembly 50 placed in the recess 86; and the hard laminated film 83 that is provided to cover the opening of the recess 86 holding the wound electrode assembly 50. The hard laminated film 83 is so formed that when the recess 86, in which the wound electrode assembly 50 is placed, is wrapped in it, its two short sides are in contact with each other or opposed with a small distance therebetween. As shown in FIGS. 6 and 7, on the top side, a long side of the hard laminated film 83 has notches 84. The notches 84 are formed to be located on both short sides when viewed from the front of the battery cell 80. The formation of the notches 84 can make it easy to engage the top cover 82a.

The hard and soft laminated films 83 and 85 are sealed at a seal portion. The positive and negative electrode leads 51 and 52, which are electrically connected to the positive and negative electrodes 53 and 54 of the wound electrode assembly 50, respectively, extend out from the seal portion.

The top and bottom covers 82a and 82b are so shaped that they can be engaged to the openings at both ends of the battery cell 80. Specifically, when viewed from the front, they are rectangular as a whole, and both short sides of each cover bulge outwards to form elliptical arcs. The term "the front" means a direction in which the battery cell 80 is viewed from the top side.

(Exterior Component)

As shown in FIGS. 6 and 7, the exterior component includes the soft laminated film 85 formed with the recess 86 for holding the wound electrode assembly 50; and a hard laminated film 83 that is overlaid on the soft laminated film 85 to cover the recess 86.

(Soft Laminated Film)

The soft laminated film 85 has the same structure as that of the exterior member 60 in the second embodiment.

Specifically, the soft laminated film 85 has the feature that the metal layer is made of a soft metal material such as annealed aluminum (JIS A8021P-O or JIS A8079P-O).

(Hard Laminated Film)

The hard laminated film 83 has the function of maintaining the shape obtained after bending and withstanding deformation from external forces. Therefore, the laminated film has the feature that the metal layer is made of a hare metal material such as aluminum (Al), stainless steel (SUS), iron (Fe), copper (Cu), or nickel (Ni), specifically, unannealed hard aluminum (JIS A3003P-H18 or JIS A3004P-H18) or austenitic stainless steel (SUS 304).

(Wound Electrode Assembly)

The wound electrode assembly 50 has the same structure as that of the wound electrode assembly 30 in the second embodiment. Alternatively, the electrode laminate 70 shown in the second example of the second embodiment may also be used instead of the wound electrode assembly 50.

(Nonaqueous Electrolyte)

The nonaqueous electrolyte formed between the positive electrode 53 and the separator 55 and between the negative electrode 54 and the separator 55 is the same as the nonaqueous electrolyte of the first embodiment.

(Separator)

The separator 55 is the same as the separator 35 in the second embodiment.

(Circuit Board)

The circuit board 81 is a component to which the positive and negative electrode leads 51 and 52 of the wound electrode assembly 50 are electrically connected. The circuit board 81 has mounted components such as a protective circuit containing temperature protection elements such as a fuse, a positive temperature coefficient (PTC) element, and a thermistor; and an ID resistor for identifying the battery pack, and also has a plurality of (for example, three) contact points formed thereon. The protective circuit has charge/discharge control field effect transistors (FETs), an integrated circuit (IC) for monitoring the battery cell 80 and controlling the charge/discharge control FETs, and other components.

The PCT element is connected in series to the wound electrode assembly and functions to substantially interrupt the current through the battery by sharply increasing the electric resistant when the battery temperature becomes higher than the preset temperature. The fuse is also connected in series to the wound electrode assembly and functions to interrupt the current by melting itself with the current through it when an overcurrent flows through the battery. A heater resistor is also provided in the vicinity of the fuse. At an overvoltage, the temperature of the heater resistor increases, so that the fuse melts to interrupt the current.

If the terminal voltage of the battery cell 80 becomes equal to or higher than the end-of-charge voltage, which is higher than the full charge voltage, the battery cell 80 may encounter a dangerous situation such as heating or ignition. Therefore, the protective circuit is configured to monitor the voltage of the battery cell 80 and to stop charging by turning off the charge control FET when the battery cell 80 reaches the end-of-charge voltage. If the terminal voltage of the battery cell 80 reaches the end-of-discharge voltage or less due to overdischarge so that the battery cell 80 reaches 0 V, the battery cell 80 may be internally shorted to become non-rechargeable. Therefore, the voltage of the battery cell 80 is monitored, and discharging is stopped by turning off the discharge control FET when the end-of-discharge voltage is reached.

(Top Cover)

The top cover 82a is engaged to the top-side opening of the battery cell 80. A side wall for fitting to the top-side opening is formed partially or entirely along the outer periphery of the top cover 82a. The battery cell 80 and the top cover 82a are joined by heat-sealing the side wall of the top cover 82a and the inner surface of an end portion of the hard laminated film 83.

The circuit board 81 is housed in the top cover 82a. The top cover 82a has a plurality of openings at positions corresponding to the contact points so that the contact points of the circuit board 81 can be exposed to the outside. A contact between any electronic device and the contact points of the circuit board 81 can be established through the openings of the top cover 82a. This allows the electrical connection between the battery pack 90 and any electronic device. The top cover 82a with such features is previously formed by injection molding.

(Bottom Cover)

The bottom cover 82b is engaged to the bottom-side opening of the battery cell 80. A side wall for fitting to the bottom-side opening is formed partially or entirely along the outer periphery of the bottom cover 82b. The battery cell 80 and the bottom cover 82b are joined by heat-sealing the side wall of the bottom cover 82b and the inner surface of an end portion of the hard laminated film 83.

The bottom cover 82b with such features is previously formed by injection molding. Alternatively, another molding method may also be used, which includes placing the battery cell 80 in a mold and pouring a hot melt resin into the bottom portion so that the cover is formed integrally with the battery cell 80.

[Method for Producing Battery Pack]

(Production of Battery Cell)

The wound electrode assembly 50 is placed in the recess 86 of the soft laminated film 85, and the hard laminated film 83 is placed to cover the recess 86. In this process, the hard and soft laminated films 83 and 85 are so arranged that the inner resin layer of the hard laminated film 83 faces the inner resin layer of the soft laminated film 85. Subsequently, the hard and soft laminated films 83 and 85 are sealed together along the periphery of the recess 86. Using a heater head made of metal (not shown), the sealing is performed by heat-sealing the inner resin layers of the hard and soft laminated films 83 and 85 under reduced pressure.

A nonaqueous electrolytic solution is injected from a non-heat-sealed side in the process of heat-sealing the inner resin layers of the hard and soft laminated films 83 and 85 under reduced pressure. Alternatively, gelled electrolytes may be formed in advance on both sides of each of the positive and negative electrodes when the wound electrode assembly 50 is formed.

Subsequently, as shown in FIG. 8, the hard laminated film 83 is so deformed that the short sides of the hard laminated film 83 are in contact with each other. In this process, an adhesive film 87 is placed between the hard and soft laminated films 83 and 85. The adhesive film 87 is made of a resin material having high adhesion to both of the inner resin layer of the hard laminated film 83 and the outer resin layer of the soft laminated film 85. Subsequently, an area at which the seam between the short sides of the hard laminated film 83 is located is heated by a heater head. Thus, the inner resin layer of the hard laminated film 83 and the outer resin layer of the soft laminated film 85 are heat-sealed together, so that the battery cell 80 is obtained. Alternatively to using the adhesive film 87, an adhesive layer with high adhesion to the outer resin layer of the soft laminated film 85 may be formed on the surface of the inner resin layer of the hard laminated film 83 and then subjected to heat sealing.

(Production of Battery Pack)

Subsequently, the positive and negative electrode leads 51 and 52 extending from the battery cell 80 are connected to the circuit board 81. Thereafter, the circuit board 81 is placed in the top cover 82a, and then the top cover 82a is engaged to the top-side opening of the battery cell 80. The bottom cover 82b is also engaged to the bottom-side opening of the battery cell 80.

Finally, the engaged portions of the top and bottom covers 82a and 82b are each heated by a heater head so that the top and bottom covers 82a and 82b and the inner resin layer of the hard laminated film 83 are heat-sealed together. In this way, the battery pack 90 is obtained.

(3-2) Second Example

A description will be given of a second example of the laminated film-type battery pack according to the third embodiment. This battery pack is what is called a simple battery pack (also called a soft pack). The simple battery pack, which is to be built into an electronic device, has a battery cell, a protective circuit, and other components fixed with an insulating tape or the like, in which part of the battery cell is exposed and provided with an output port such as a connector to be connected to the main body of the electronic device.

Figure 10A:
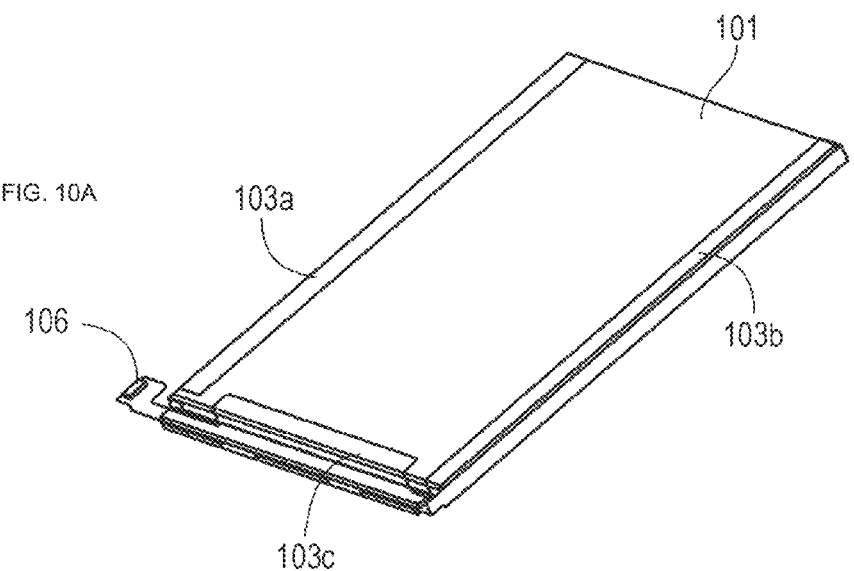
FIG. 10A is a schematic perspective view showing an appearance of the simple battery pack.

An example of the structure of the simple battery pack will be described. FIG. 9 is an exploded perspective view showing an example of the structure of the simple battery pack. FIG. 10A is a schematic perspective view showing an appearance of the simple battery pack, and FIG. 10B is a schematic perspective view showing another appearance of the simple battery pack.

Figure 10B:
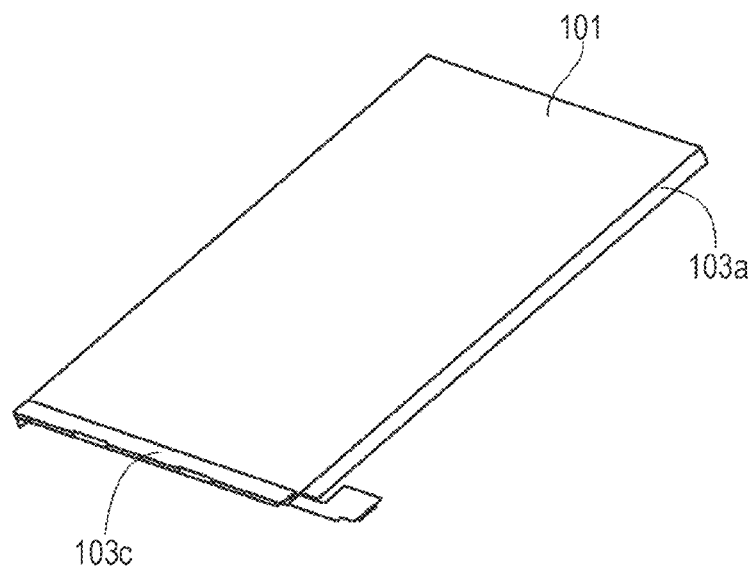
FIG. 10B is a schematic perspective view showing another appearance of the simple battery pack.

As shown in FIGS. 9 and 10A to 10B, the simple battery pack includes a battery cell 101, leads 102a and 102b extending from the battery cell 101, insulating tapes 103a to 103c, an insulating plate 104, a circuit board 105 having a protective circuit (protection circuit module (PCM)), and a connector 106. The battery cell 101 is, for example, the same as the nonaqueous electrolyte secondary battery according to the second embodiment.

The insulating plate 104 and the circuit board 105 are disposed on a terrace portion 101a at the front end of the battery cell 101, and the leads 102a and 102b extending from the battery cell 101 are connected to the circuit board 105.

The connector 106 for output is connected to the circuit board 105. The battery cell 101, the insulating plate 104, the circuit board 105, and other components are fixed by bonding the insulating tapes 103a to 103c to predetermined sites.

4. Fourth Embodiment

Figure 11:
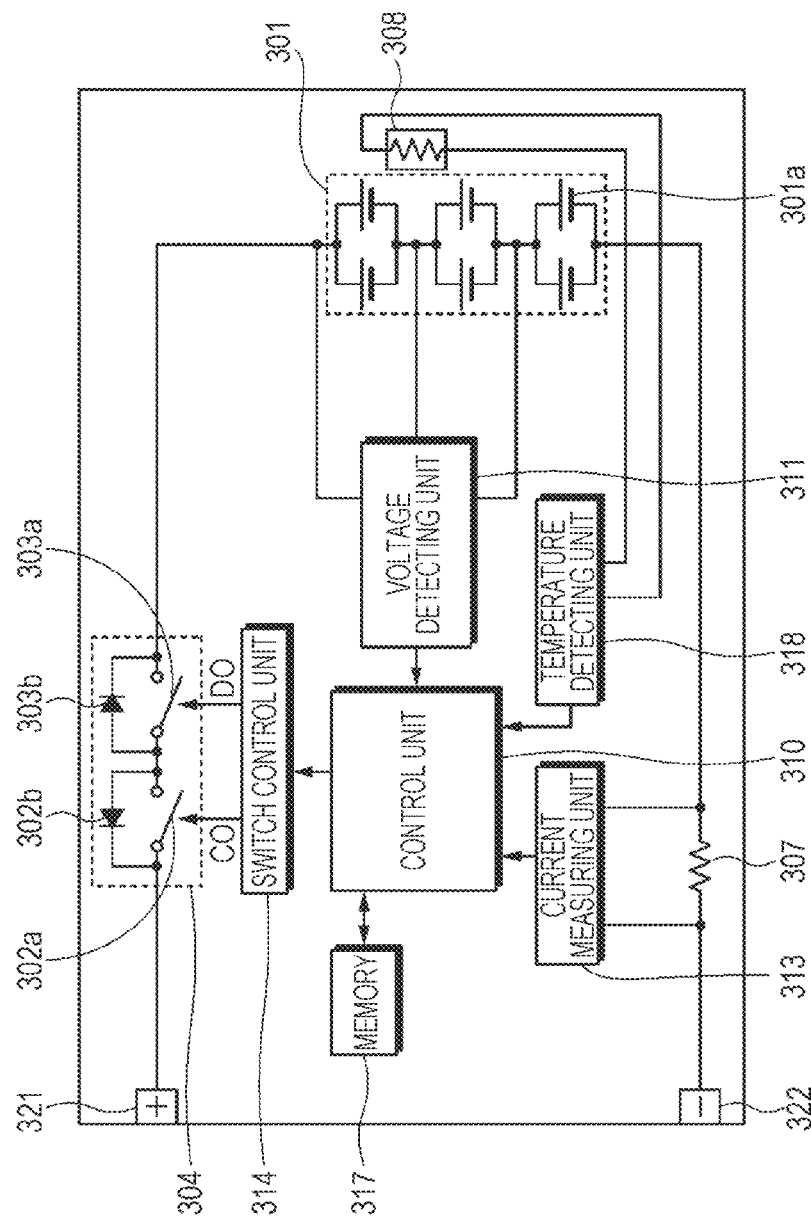
FIG. 11 is a block diagram showing an example of the circuit configuration of a battery pack according to an embodiment of the present technology.

FIG. 11 is a block diagram showing an example of a circuit configuration in a case where the battery according to the second embodiment of the present technology (hereinafter, referred to as "the secondary battery" as needed) is used in a battery pack. The battery pack includes an assembled battery 301, an exterior casing, a switch unit 304 including a charging control switch 302a and a discharging control switch 303a, a current detecting resistor 307, a temperature detecting element 308, and a control unit 310.

The battery pack also includes a positive electrode terminal 321 and a negative electrode lead 322. During charging, the positive electrode terminal 321 and the negative electrode lead 322 are connected to the positive and negative electrode terminals of a charger, respectively, and charging is performed. During use of an electronic device, the positive electrode terminal 321 and the negative electrode lead 322 are connected to the positive and negative electrode terminals of the electronic device, respectively, and discharging is performed.

The assembled battery 301 includes a plurality of secondary batteries 301a connected in series and/or in parallel. Each of the secondary batteries 301a is the secondary battery of the present technology. FIG. 11 shows an example where six secondary batteries 301a are connected in such a way that three sets of two batteries in parallel are connected in series (2P3S). However, any other connection pattern such as an n-parallel m-series pattern (n and m are each an integer) may be used.

The switch unit 304 includes the charging control switch 302a, a diode 302b, the discharging control switch 303a, and a diode 303b, and is controlled by the control unit 310. The diode 302b has a reverse polarity with respect to the charging current that flows in the direction from the positive electrode terminal 321 to the assembled battery 301, and has a forward polarity with respect to the discharging current that flows in the direction from the negative electrode lead 322 to the assembled battery 301. The diode 303b has a forward polarity with respect to the charging current and a reverse polarity with respect to the discharging current. In this example, the switch unit 304 is provided on the positive side. Alternatively, it may be provided on the negative side.

The charging control switch 302a is controlled by a charging and discharging control unit in such a way that when the battery voltage reaches an over-charging detection voltage, the charging control switch 302a is turned off in order for the charging current not to flow through the current path of the assembled battery 301. After the charging control switch 302a is turned off, only discharging is possible through the diode 302b. The charging control switch 302a is also controlled by the control unit 310 in such a way that when a large current flows during charging, the charging control switch 302a is turned off to interrupt the charging current flowing through the current path of the assembled battery 301.

The discharging control switch 303a is controlled by the control unit 310 in such a way that when the battery voltage reaches an over-discharging detection voltage, the discharging control switch 303a is turned off in order for the discharging current not to flow through the current path of the assembled battery 301. After the discharging control switch 303a is turned off, only charging is possible through the diode 303b. The discharging control switch 303a is also controlled by the control unit 310 in such a way that when a large current flows during discharging, the discharging control switch 303a is turned off to interrupt the discharging current flowing through the current path of the assembled battery 301.

The temperature detecting element 308 is, for example, a thermistor, which is provided in the vicinity of the assembled battery 301 to measure the temperature of the assembled battery 301 and to send the measured temperature value to the control unit 310. The voltage detecting unit 311 is configured to measure the voltages of the assembled battery 301 and each of the secondary batteries 301a constituting the assembled battery 301, to A/D convert the measured voltages, and to send the converted voltage values to the control unit 310. The current measuring unit 313 is configured to measure the current by using the current detecting resistor 307 and to send the measured current value to the control unit 310.

The switch control unit 314 is configured to control the charging and discharging control switches 302a and 303a of the switch unit 304 based on the voltage and current values input from the voltage detecting unit 311 and the current measuring unit 313. When the voltage of any one of the secondary batteries 301a is equal to or lower than the over-charging detection voltage or the over-discharging detection voltage or when a large current flows abruptly, the switch control unit 314 transmits a control signal to the switch unit 304 to prevent over-charging, over-discharging, and over-current charging and discharging.

In this regard, for example, when the secondary battery is a lithium ion secondary battery, the over-charging detection voltage is set to, for example, 4.20 V±0.05 V, and the over-discharging detection voltage is set to, for example, 2.4 V±0.1 V.

The charging and discharging switch may be, for example, a semiconductor switch such as a MOSFET. In this case, the parasitic diodes of the MOSFET function as the diodes 302b and 303b. When a P-channel FET is used as the charging and discharging switch, the switch control unit 314 sends control signals DO and CO to the gates of the charging and discharging control switches 302a and 303a, respectively. In the case of the P-channel type, the charging and discharging control switches 302a and 303a are turned on by a gate potential lower than the source potential by a predetermined value. In other words, in the normal charging and discharging operation, the control signals CO and DO are set to a low level, and the charging and discharging control switches 302a and 303a are set to an ON-state.

For example, during over-charging or over-discharging, the control signals CO and DO are set to a high level, and the charging and discharging control switches 302a and 303a are set to an OFF-state.

A memory 317 is provided, including a RAM or ROM, specifically, an erasable programmable read only memory (EPROM), which is a nonvolatile memory. The memory 317 stores, in advance, numerical values calculated by the control unit 310, the internal resistance value of each secondary battery 301a in the initial state measured in the manufacturing process, and other data, which are rewritable as appropriate. In addition, when the full-charge capacity of the secondary batteries 301a is stored in the memory 317, for example, the residual capacity can be calculated by the control unit 310 and the memory 317.

The temperature detecting unit 318 is configured to measure the temperature by using the temperature detecting element 308, to perform the control of charging and discharging when abnormal heat generation occurs, and to correct the calculation of the residual capacity.

5. Fifth Embodiment

The battery according to the second embodiment of the present technology and the battery packs according to the third and fourth embodiments using the battery can be used to be installed in or to supply power to devices such as electronic devices, electrically-driven vehicles, and electrical storage devices.

Examples of electronic devices include notebook computers, personal digital assistants (PDAs), cellular phones, cordless phone handsets, video movie cameras, digital still cameras, electronic books, electronic dictionaries, music players, radios, headphones, gaming machines, navigation systems, memory cards, pacemakers, hearing aids, electric tools, electric shavers, refrigerators, air conditioners, televisions, stereos, water heaters, microwave ovens, dishwashers, washing machines, dryers, illuminators, toys, medical instruments, robots, road conditioners, and signals.

Examples of electrically-driven vehicles include railway vehicles, golf carts, electric carts, and electric cars (including hybrid cars). The battery or the battery pack is used as a driving power source or an auxiliary power source for these vehicles.

Examples of electrical storage devices include power sources for power storage in buildings such as houses and power generating facilities.

Among the above application examples, specific examples of an electrical storage system using an electrical storage device having the battery of the present technology described above will be described below.

The electrical storage system may have, for example, any of the following features. A first electrical storage system includes an electrical storage device that is charged by a power generator capable of generating power from renewable energy sources. A second electrical storage system has an electrical storage device and is configured to supply power to an electronic device connected to the electrical storage device. A third electrical storage system is an electronic device that is configured to receive power from an electrical storage device. These storage systems are implemented to efficiently supply power in cooperation with external power supply networks.

A fourth electrical storage system is an electrically-driven vehicle including an electrical storage device; a converter configured to receive power from the electrical storage device and to convert the power into a driving force; and a controller configured to process information about vehicle control based on the information about the electrical storage device. A fifth electrical storage system is a power system that includes an electrical storage device and a power information transmitting and receiving unit configured to transmit and receive signals to and from other devices through networks and is configured to control the charging and discharging of the electrical storage device based on the information received by the transmitting and receiving unit. A sixth electrical storage system is a power system that is configured to receive power from the electrical storage device or to supply power to the electrical storage device from a power generator or a power network. Hereinafter, the electrical storage systems will be described.

(5-1) Electrical Storage System in House as Application Example

Figure 12:
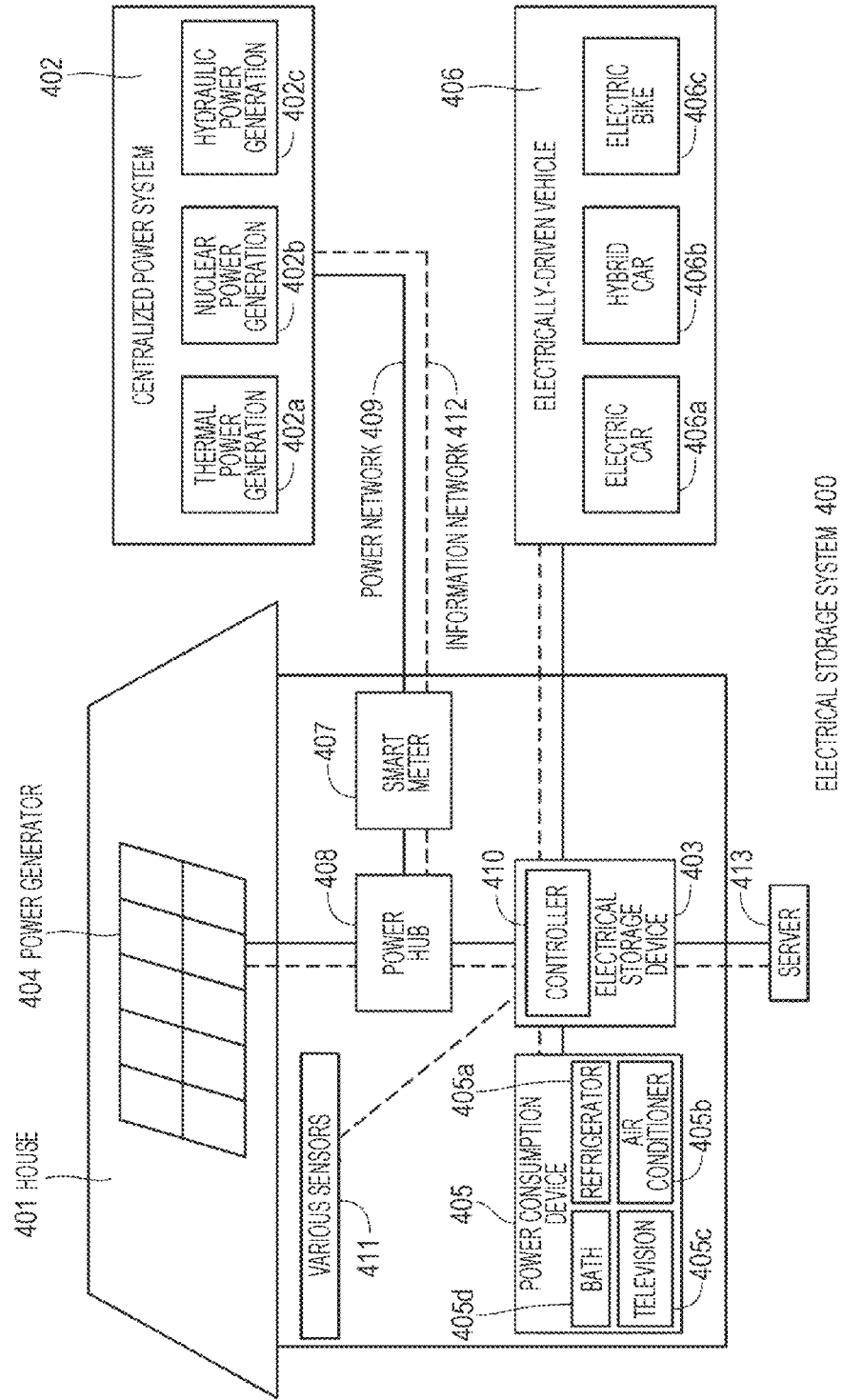
FIG. 12 is a schematic diagram showing an example where the nonaqueous electrolyte battery of the present technology is used in a house electrical storage system.

An example where an electrical storage device including the battery of the present technology is used in an electrical storage system for a house will be described with reference to FIG. 12. For example, in an electrical storage system 400 for a house 401, power is supplied to an electrical storage device 403 from a centralized power system 402 such as a thermal power generation system 402a, a nuclear power generation system 402b, or a hydraulic power generation system 402c through a power network 409, an information network 412, a smart meter 407, a power hub 408, and other parts. In addition, power is supplied to the electrical storage device 403 from an independent power source such as a home power generator 404. The supplied power is stored in the electrical storage device 403. Power for use in the house 401 is supplied using the electrical storage device 403. The same electrical storage system may also be used in other buildings as well as in the house 401.

The house 401 is equipped with the power generator 404, power consumption devices 405, the electrical storage device 403, a controller 410 for controlling each device, the smart meter 407, and sensors 411 for acquiring various pieces of information. The respective devices are connected via the power network 409 and the information network 412. A solar cell, a fuel cell, or the like is used as the power generator 404, from which generated power is supplied to the power consumption devices 405 and/or the electrical storage device 403. Examples of the power consumption devices 405 include a refrigerator 405a, an air conditioner 405b, a television receiver 405c, and a bath 405d. Examples of the power consumption devices 405 also include electrically-driven vehicles 406. The electrically-driven vehicles 406 include an electric car 406a, a hybrid car 406b, and an electric bike 406c.

The battery of the present technology is used in the electrical storage device 403. The battery of the present technology may include, for example, the lithium ion secondary battery described above. The smart meter 407 has the functions of measuring the amount of consumption of commercial power and transmitting the measured amount value to a power company. The power network 409 may be of any one of or a combination of two or more of a DC power supply type, an AC power supply type, and a non-contact power supply type.

Examples of the various sensors 411 include motion sensors, luminance sensors, object detecting sensors, power consumption sensors, vibration sensors, contact sensors, temperature sensors, and infrared sensors. The information acquired by the various sensors 411 is transmitted to the controller 410. Weather conditions, human conditions, and other conditions are grasped based on the information from the sensors 411 so that the energy consumption can be kept minimal by automatic control of the power consumption devices 405. The controller 410 can also transmit information about the house 401 to an external power company or the like through the Internet.

The power hub 408 allows power line branching, DC-AC conversion, and other processes. Examples of the communication method for the information network 412 connected to the controller 410 include methods using a communication interface such as a universal asynchronous receiver-transceiver interface (UART) (a transmitting and receiving circuit for asynchronous serial communication) and methods using a sensor network according to a wireless communication standard such as Bluetooth, ZigBee, or Wi-Fi. Bluetooth methods are used for multimedia communication and allow one-to-many connection communication. ZigBee uses the physical layer of IEEE (Institute of Electrical and Electronics Engineers) 802.15.4. IEEE 802.15.4 is the name of a short-range wireless network standard called Personal Area Network (PAN) or Wireless PAN (WPAN).

The controller 410 is connected to an external server 413. The server 413 may be managed by any one of the house 401, the power company, and a service provider. Examples of the information transmitted to and received from the server 413 include power consumption information, life pattern information, power rates, weather information, disaster information, and information about power transaction. These types of information may be transmitted to and received from the home power consumption device (such as the television receiver) or may be transmitted to and received from a device outside the home (such as a cellular phone). For example, these types of information may be displayed on a device having a display function, such as a television receiver, a cellular phone, or a personal digital assistant (PDA).

The controller 410 for controlling each unit includes a central processing unit (CPU), a random access memory (RAM), a read only memory (ROM), and other components, and is installed in the electrical storage device 403 in this example. The controller 410 is connected to the electrical storage device 403, the home power generator 404, the power consumption devices 405, the various sensors 411, and the server 413 through the information network 412, and has, for example, the function of controlling the amount of consumption of commercial power and the amount of power generation. The controller 410 may further have other functions such as the function of performing power transaction in the power market.

As described above, the electrical storage device 403 can store not only the power from the centralized power system 402 such as the thermal power generation system 402a, the nuclear power generation system 402b, or the hydraulic power generation system 402c but also the power generated by the home power generator 404 (photovoltaic power generation or wind power generation). Therefore, even when the power generated from the home power generator 404 fluctuates, control can be performed in such a way that the amount of power transmitted to the outside is kept constant or that the power is discharged in a necessary amount. For example, the electrical storage device 403 may be used in such a way that the power obtained by photovoltaic power generation is stored in the electrical storage device 403 while inexpensive midnight power is stored in the electrical storage device 403 during night and the power stored in the electrical storage device 403 is discharged in a daytime period when the power rates are high.

This example shows a case where the controller 410 is installed in the electrical storage device 403. Alternatively, the controller may be installed in the smart meter 407 or configured independently. Alternatively, the electrical storage system 400 may be used for a plurality of dwelling units of an apartment house or for a plurality of detached houses.

(5-2) Electrical Storage System in Vehicle as Application Example

Figure 13:
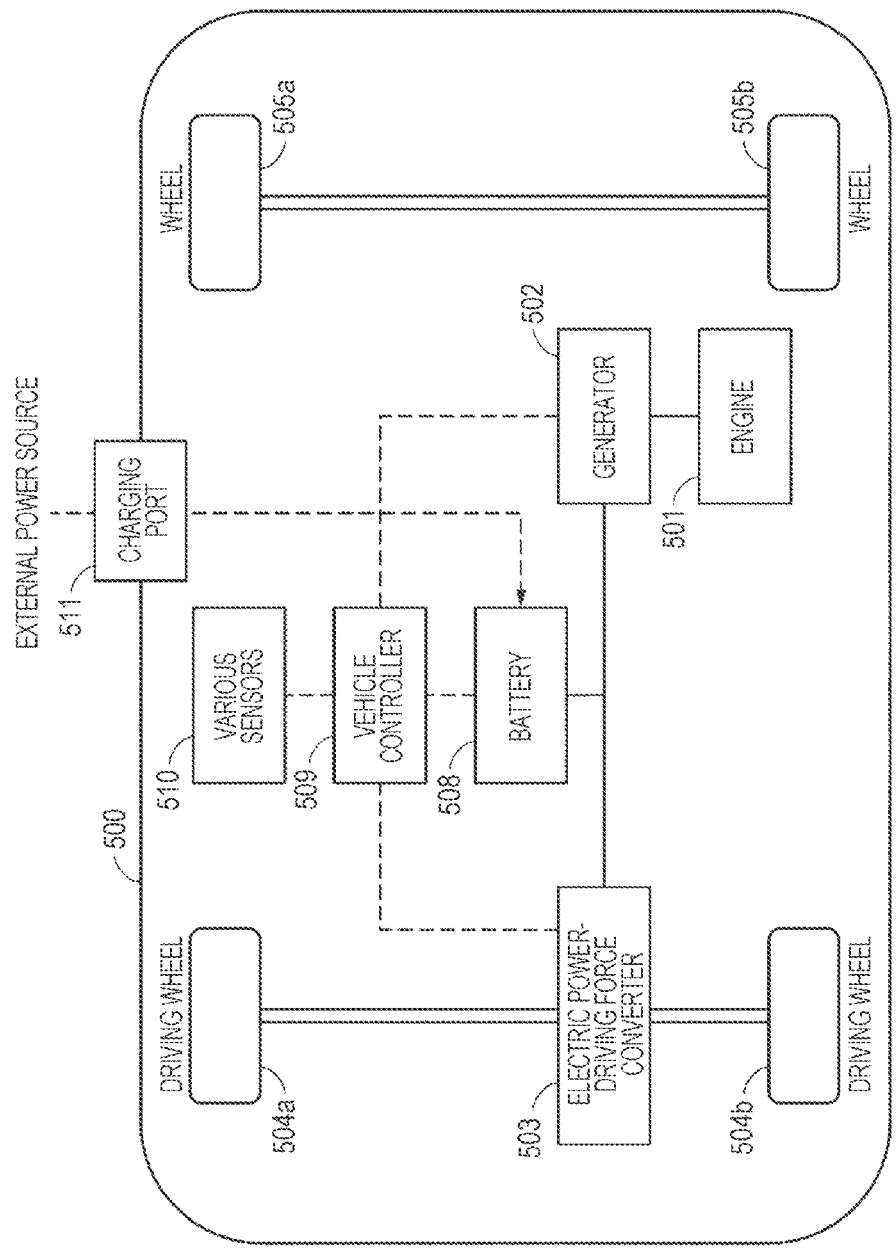
FIG. 13 is a schematic diagram schematically showing an example of the configuration of a hybrid vehicle using a series hybrid system to which the present technology is applied.

An example where the present technology is applied to an electrical storage system for a vehicle will be described with reference to FIG. 13. FIG. 13 schematically shows an example of a configuration of a hybrid car that employs a series hybrid system to which the present technology is applied. The series hybrid system is a vehicle that travels using an electric power-driving force converter configured to work using power generated by an electric generator, which is moved by an engine, or using the generated power temporarily stored in a battery.

The hybrid vehicle 500 is equipped with an engine 501, a generator 502, an electric power-driving force converter 503, driving wheels 504a and 504b, wheels 505a and 505b, a battery 508, a vehicle controller 509, various sensors 510, and a charging port 511. The battery of the present technology described above is used to form the battery 508.

The hybrid vehicle 500 travels using the electric power-driving force converter 503 as a power source. An example of the electric power-driving force converter 503 is a motor. The electric power-driving force converter 503 operates using the power from the battery 508, and the torque of the electric power-driving force converter 503 is transmitted to the driving wheels 504a and 504b. When a DC-AC converter or an inverter (AC-DC converter) is used at a necessary part, the electric power-driving force converter 503 can work with any of an AC motor and a DC motor. The various sensors 510 are configured to control the engine speed or the opening degree of a throttle valve (not shown) (throttle opening degree) through the vehicle controller 509. Examples of the various sensors 510 include speed sensors, acceleration sensors, and engine speed sensors.

The torque of the engine 501 is transmitted to the generator 502, and the electric power generated by the generator 502 using the torque can be stored in the battery 508.

When the hybrid vehicle 500 is decelerated by a brake mechanism (not shown), a resistance force during the deceleration is transmitted as a torque to the electric power-driving force converter 503, and the torque allows the electric power-driving force converter 503 to generate regenerative electric power, which is stored in the battery 508.

When the battery 508 is connected to an external power source for the hybrid vehicle 500, the power can be supplied from the external power source via the charging port 511 as an input port, and the supplied power can also be stored.

Although not shown, the vehicle may further include an information processor configured to process information about vehicle control based on the information about the secondary battery. Such an information processor may be, for example, an information processor configured to display the amount of residual power in the battery based on the information about the amount of residual power in the battery.

A series hybrid car has been described as an example, in which the hybrid car travels using a motor driven by power generated from a generator, which is driven by an engine, or using the generated power temporarily stored in a battery. However, the present technology is also effectively applicable to parallel hybrid cars, which have both an engine and a motor as driving power sources and interchangeably use the three modes: traveling with the engine alone, traveling with the motor alone, and traveling with the engine and the motor, as appropriate. Moreover, the present technology is also effectively applicable to what are called electrically-driven vehicles, which do not use any engine and travel using a driving motor only.

EXAMPLES

Hereinafter, the present technology will be more specifically described with reference to examples. It will be understood that the examples described below are not intended to limit the features of the present technology.

Example 1

Preparation of Positive Electrode

First, a positive electrode mixture slurry was obtained by uniformly mixing 91 parts by mass of lithium cobalt complex oxide (LiCoO$_2$) as a positive electrode active material, 6 parts by mass of graphite as a conductive agent, and 10 parts by mass of polyvinylidene fluoride (PVdF) as a binder and then dispersing the mixture in N-methyl-2-pyrrolidone (NMP).

Subsequently, the resulting positive electrode mixture slurry was uniformly applied to both surfaces of a 20-μm-thick, strip-shaped, aluminum foil as a positive electrode collector and then dried to form positive electrode active material layers. A positive electrode was prepared by cutting a 38-mm-wide, 700-mm-long piece from the product, and then, a positive electrode terminal was attached thereto.

(Preparation of Negative Electrode)

Next, a negative electrode mixture slurry was obtained by uniformly mixing 90 parts by mass of artificial graphite as a negative electrode active material and 10 parts by mass of PVdF as a binder and then dispersing the mixture in NMP. Subsequently, the resulting negative electrode mixture slurry was uniformly applied to both surfaces of a 10-μm-thick, strip-shaped, copper foil as a negative electrode collector and then dried to form negative electrode active material layers. A negative electrode was prepared by cutting a 40-mm-wide, 650-mm-long piece from the product, and then, a negative electrode terminal was attached thereto.

(Preparation of Nonaqueous Electrolyte Material)

The nonaqueous electrolyte material to be used was prepared by mixing 90 parts by mass of a nonaqueous electrolytic solution, 10 parts by mass of a polyvinylidene fluoride-hexafluoropropylene copolymer (PVdF:HFP=93.1:6.9 (mass ratio)) as a matrix resin, and 10 parts by mass of talc (Mg$_3$Si$_4$O$_{10}$(OH)$_2$) particles (aspect ratio (long side/short side)=400/1) as a filler (inorganic particles) and then adding dimethyl carbonate as a viscosity adjusting solvent to the mixture so that the viscosity was adjusted to 50 mPa·s.

The nonaqueous electrolytic solution used was prepared by dissolving lithium hexafluorophosphate (LiPF$_6$) as an electrolyte salt at a concentration of 0.8 mol/kg in a non-aqueous solvent obtained by mixing ethylene carbonate and propylene carbonate in a ratio of 6:4 (by mass). It should be noted that dimethyl carbonate is finally allowed to evaporate and thus does not remain in the battery.

(Preparation of Nonaqueous Electrolyte Secondary Battery)

The resulting nonaqueous electrolyte material was applied to both surfaces of each of the resulting positive and negative electrodes to form nonaqueous electrolyte layers (gelled electrolyte layers). The positive and negative electrodes each with the nonaqueous electrolyte layers were stacked and wound with a 12-μm-thick microporous polyethylene film as a separator interposed therebetween. The wound product was sealed in an exterior member made of an aluminum laminated film so that a nonaqueous electrolyte secondary battery of Example 1 was obtained.

Examples 2 to 9

In Examples 2 to 9, nonaqueous electrolyte secondary batteries were obtained as in Example 1, except that at least one of the aspect ratio of the inorganic particles used as the filler and the degree of orientation of the inorganic particles was changed.

In Examples 2 to 9, the degree of orientation was controlled by changing at least one of the viscosity of the nonaqueous electrolyte material and the aspect ratio of the inorganic particles. For example, the orientation can be controlled to a lower degree by reducing the aspect ratio of the inorganic particles, and the orientation can be controlled to a higher degree by increasing the aspect ratio of the inorganic particles. The orientation of the filler can also be controlled to a lower or higher degree by changing the viscosity of the nonaqueous electrolyte material (the same applies to the examples and the comparative examples below).

Examples 10 to 18

In Examples 10 to 18, nonaqueous electrolyte secondary batteries were obtained as in Example 6, except that the mass ratio of the inorganic particles to the matrix resin (inorganic particles/matrix resin) was changed.

Example 19

A nonaqueous electrolyte secondary battery was obtained as in Example 1, except that boehmite particles (aspect ratio (long side/short side)=400/1) were used as the filler instead of the talc particles.

Examples 20 to 27

In Examples 20 to 27, nonaqueous electrolyte secondary batteries were obtained as in Example 19, except that at least one of the aspect ratio of the inorganic particles used as the filler and the degree of orientation of the inorganic particles was changed.

Examples 28 to 36

In Examples 28 to 36, nonaqueous electrolyte secondary batteries were obtained as in Example 24, except that the mass ratio of the inorganic particles to the matrix resin (inorganic particles/matrix resin) was changed.

Examples 37 to 73

In Examples 37 to 73, the type of the inorganic particles as the filler was changed as shown in Table 1 below. The degree of orientation was also controlled, as needed, by changing the viscosity of the nonaqueous electrolyte material. Nonaqueous electrolyte secondary batteries were prepared as in Example 1, except for the above.

Comparative Example 1

In Comparative Example 1, a nonaqueous electrolyte containing no inorganic particles was prepared. A nonaqueous electrolyte secondary battery was prepared as in Example 1, except for the above.

Comparative Examples 2 to 6

In Comparative Examples 2 to 6, the type of the inorganic particles as the filler was changed as shown in Table 1 below. The degree of orientation was also controlled, as needed, by changing the viscosity of the nonaqueous electrolyte material. Nonaqueous electrolyte secondary batteries were prepared as in Example 1, except for the above.

[Evaluation of Degree of Orientation]

In each of the examples and the comparative examples, the degree of orientation was evaluated by observing part of the cross-section of the nonaqueous electrolyte battery with a scanning electron microscope.

In the SEM image, the angle of the thickness direction of the particle with respect to the normal of the electrode surface as a reference line was determined for each of 50 particles (primary particles) in a region from at least one surface of the separator to 3 µm depth. When the angle was 0° to 30° for 70% (by number) or more of the particles in the region, the particles were determined to be oriented parallel to the electrode surface (a high or middle degree of orientation), and otherwise, the particles were evaluated as being not oriented parallel to the electrode surface (a low degree of orientation). In addition, as for the particles determined to be oriented parallel to the electrode surface, when the angle was 0° to 10° for 70% (by number) or more of the particles in the region, the particles were evaluated as having a high degree of orientation, and otherwise, the particles were evaluated as having a middle degree of orientation.

Figure 14A:
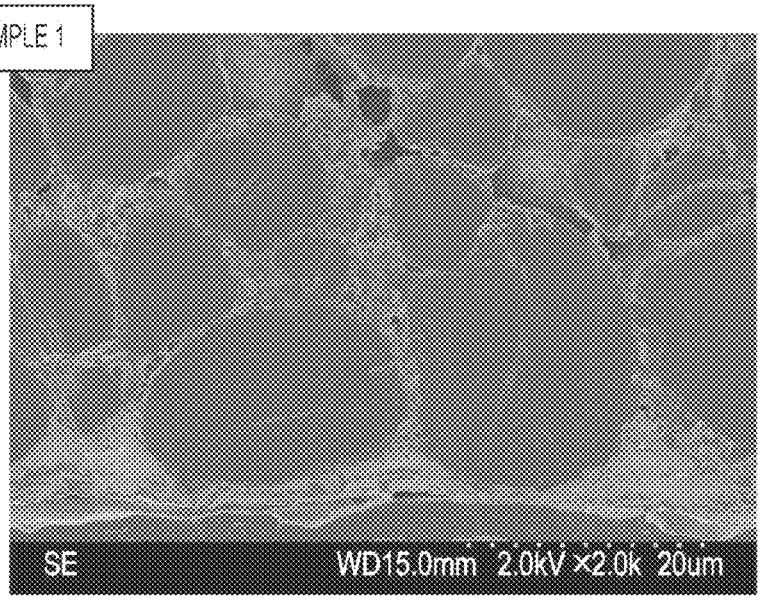
FIG. 14A is an SEM photograph of a cross-section of the nonaqueous electrolyte of Example 1.
Figure 14B:
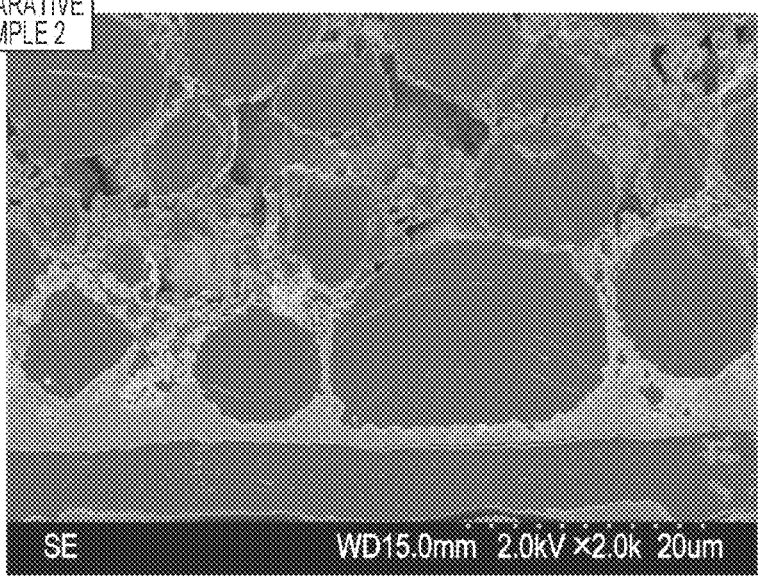
FIG. 14B is an SEM photograph of a cross-section of the nonaqueous electrolyte of Comparative Example 2.

As an example, FIG. 14A shows a scanning electron microscope (SEM) photograph of the cross-section of the nonaqueous electrolyte in the nonaqueous electrolyte secondary battery of Example 1. FIG. 14B shows a scanning electron microscope photograph of the cross-section of the nonaqueous electrolyte in the nonaqueous electrolyte secondary battery of Comparative Example 2. FIG. 15A shows a partially enlarged SEM photograph of FIG. 14A. FIG. 15B shows a partially enlarged SEM photograph of FIG. 14B.

When talc particles were used (Examples 1 to 18 and Comparative Example 4), the degree of orientation was also evaluated by X-ray diffraction measurement of the nonaqueous electrolyte. As a result of the measurement, the nonaqueous electrolyte with an X-ray diffraction pattern peak intensity ratio ((006) plane diffraction peak intensity/(132) plane diffraction peak intensity) of less than 10 was evaluated as having a low degree of orientation, that with a peak intensity ratio of 10 to less than 50 was evaluated as having a middle degree of orientation, and that with a peak intensity ratio of 50 to 1,000 was evaluated as having a high degree of orientation. As a result of the evaluation, the degree of orientation was high in Examples 1 to 6 and Examples 10 to 16, middle in Examples 7 to 9 and Example 17, and low in Example 18 and Comparative Example 4. The results agreed with those of the evaluation of the degree of orientation by the observation with a scanning electron microscope.

Samples 1 to 3 shown below were evaluated for the degree of orientation by X-ray diffraction measurement. FIG. 16 shows the X-ray diffraction patterns and the peak intensity ratios ((006) plane diffraction peak intensity/(132) plane diffraction peak intensity) of samples 1 to 3. In FIG. 16, lines S1, S2, and S3 show the X-ray diffraction patterns of samples 1, 2, and 3, respectively.

<Sample 1>

Talc (aspect ratio (long side/short side)=50/1) powder was simply mounted on a sample holder and then subjected to X-ray diffraction measurement.

<Sample 2>

Talc (aspect ratio (long side/short side)=50/1) powder was mounted on a sample holder, then compressed to have a controlled orientation, and then subjected to X-ray diffraction measurement.

<Sample 3>

An electrode with a nonaqueous electrolyte formed as in Example 1 was subjected to X-ray diffraction measurement, and then, the peaks of talc were extracted.

[Measurement of Temperature at which Endothermic Dehydration Reaction Occurs]

In each of the examples and the comparative examples, the temperature at which the filler material undergoes an endothermic dehydration temperature (the temperature at which an endothermic dehydration reaction occurs) was measured according to the following procedure. After the prepared battery was disintegrated, the electrode was washed with dimethyl carbonate (DMC). This step separated the nonaqueous electrolyte component (gelled electrolyte component) from the coating on the electrode surface. The solution obtained by the separation of the nonaqueous electrolyte component (gelled electrolyte component) was centrifuged so that the filler component was obtained. Using a thermogravimetric analyzer (TG/DTA6300 manufactured by Seiko Instruments Inc.), the obtained filler component was heated to 1,000° C. at a rate of 10° C./minute, in which the temperature at which the endothermic dehydration reaction occurred (the decomposition temperature in Comparative Example 6) was determined from the temperature at which a Weight Loss Occurred.

[Measurement of Aspect Ratio]

In each of the examples and the comparative examples, the aspect ratio was measured as described below. Fifty particles (primary particles) in the nonaqueous electrolyte were randomly selected and then each three-dimensionally observed with a scanning electron microscope. In this process, the aspect ratio (long side/short side) of each inorganic particle was determined from the short side of the flat shape (the length of the shortest part in the thickness direction) and the length of the longest part (long side) of the area (surface) perpendicular to the thickness direction. The average of the resulting ratios was calculated as the aspect ratio.

[Performance Evaluation]

The battery of each example obtained as described above was evaluated as described below. Table 1 shows the results of the performance evaluation of Examples 1 to 73 and Comparative Examples 1 to 6.

[Evaluation of Batteries (Cycle Test)]

The laminated film-type battery prepared in each of the examples and the comparative examples was subjected to constant current charging at a charging current of 1C under a 23° C. atmosphere until a battery voltage of 4.2 V was reached. The battery was then subjected to constant voltage charging at 4.2 V, and the charging was ended when a charging current of 0.5 mA was reached. Subsequently, the battery was subjected to constant current discharging at a discharging current of 1C until a battery voltage of 3.0 V was reached, in which the discharge capacity was measured as the initial capacity. The term "1C" refers to the current value at which the theoretical capacity is discharged completely in 1 hour. Subsequently, 500 cycles (in total) of the charging-discharging process under the same conditions as those mentioned above were performed, and the discharge capacity was measured at the 500-th cycle. The capacity retention was calculated form the following formula.

Capacity retention (%)=(the discharge capacity at the 500-th cycle/the initial capacity)×100(%)

[Evaluation of Batteries (Short-Circuit Test)]

The positive and negative electrodes of the laminated film-type battery prepared in each of the examples and the comparative examples were electrically short-circuited outside the battery, in which the heat generation temperature of the laminated film-type battery was measured and the presence or absence of gas blowout was observed.

(Measurement of Heat Generation Temperature)

The case where the heat generation temperature of the laminated film-type battery was 100° C. or lower during the short circuiting was evaluated as being safe. In this case, the battery suffers from heat generation at 100° C. or lower due to separator shutdown, disconnection inside the laminated film-type battery, or other causes, but thereafter, the battery becomes disabled so that the battery temperature decreases and no more danger arises. More preferably, the highest temperature of the battery is 80° C. or lower, so that separator shutdown or disconnection inside the battery does not occur and thus the battery is still workable when the battery temperature decreases.

(Observation of the Presence or Absence of Gas Blowout)

When gas blew out from the battery, it was determined that the battery was in a dangerous state. If the positive electrode is significantly overheated despite separator shutdown or disconnection inside the battery, the positive electrode can undergo a thermal decomposition reaction so that gas can blow out from the inside of the battery.

Table 1 shows the measurement results.

TABLE 1

| | Nonaqueous electrolyte | | | | | Evaluations | | |
|---|---|---|---|---|---|---|---|---|
| | Filer | | | | | | Surface | |
| | Type | Temperature (° C.) at which endothermic reaction occurs | Aspect ratio (long side/short side) | Degree of orientation | Weight ratio Filler/resin | Capacity retention (%) after cycle test | temperature (° C.) produced by short circuit test | Gas blowout |
| Example 1 | Talc | 850 | 400/1 | High | 1/1 | 73 | 57 | Absent |
| Example 2 | Talc | 850 | 200/1 | High | 1/1 | 79 | 57 | Absent |
| Example 3 | Talc | 850 | 100/1 | High | 1/1 | 85 | 59 | Absent |
| Example 4 | Talc | 850 | 50/1 | High | 1/1 | 90 | 60 | Absent |
| Example 5 | Talc | 850 | 20/1 | High | 1/1 | 90 | 62 | Absent |
| Example 6 | Talc | 850 | 10/1 | High | 1/1 | 90 | 65 | Absent |
| Example 7 | Talc | 850 | 5/1 | Middle | 1/1 | 90 | 62 | Absent |
| Example 8 | Talc | 850 | 3/1 | Middle | 1/1 | 90 | 68 | Absent |
| Example 9 | Talc | 850 | 2/1 | Middle | 1/1 | 90 | 78 | Absent |
| Example 10 | Talc | 850 | 10/1 | High | 0.5/1 | 92 | 78 | Absent |
| Example 11 | Talc | 850 | 10/1 | High | 2/1 | 90 | 65 | Absent |
| Example 12 | Talc | 850 | 10/1 | High | 3/1 | 89 | 64 | Absent |
| Example 13 | Talc | 850 | 10/1 | High | 4/1 | 88 | 63 | Absent |
| Example 14 | Talc | 850 | 10/1 | High | 5/1 | 86 | 62 | Absent |
| Example 15 | Talc | 850 | 10/1 | High | 8/1 | 81 | 62 | Absent |
| Example 16 | Talc | 850 | 10/1 | High | 15/1 | 75 | 69 | Absent |
| Example 17 | Talc | 850 | 10/1 | Middle | 20/1 | 71 | 78 | Absent |
| Example 18 | Talc | 850 | 10/1 | Low | 25/1 | 73 | 79 | Absent |
| Example 19 | Boehmite | 450 | 400/1 | High | 1/1 | 72 | 58 | Absent |
| Example 20 | Boehmite | 450 | 200/1 | High | 1/1 | 78 | 58 | Absent |
| Example 21 | Boehmite | 450 | 100/1 | High | 1/1 | 84 | 60 | Absent |
| Example 22 | Boehmite | 450 | 50/1 | High | 1/1 | 89 | 61 | Absent |
| Example 23 | Boehmite | 450 | 20/1 | High | 1/1 | 89 | 63 | Absent |
| Example 24 | Boehmite | 450 | 10/1 | High | 1/1 | 89 | 66 | Absent |
| Example 25 | Boehmite | 450 | 5/1 | Middle | 1/1 | 89 | 72 | Absent |
| Example 26 | Boehmite | 450 | 3/1 | Middle | 1/1 | 89 | 74 | Absent |

TABLE 1-continued

|  |  | Nonaqueous electrolyte | | | | Evaluations | | |
| --- | --- | --- | --- | --- | --- | --- | --- | --- |
|  |  | Filer | | | | | Surface | |
|  | Type | Temperature (° C.) at which endothermic reaction occurs | Aspect ratio (long side/short side) | Degree of orientation | Weight ratio Filler/resin | Capacity retention (%) after cycle test | temperature (° C.) produced by short circuit test | Gas blowout |
| Example 27 | Boehmite | 450 | 2/1 | Middle | 1/1 | 89 | 79 | Absent |
| Example 28 | Boehmite | 450 | 10/1 | High | 0.5/1 | 91 | 79 | Absent |
| Example 29 | Boehmite | 450 | 10/1 | High | 2/1 | 89 | 66 | Absent |
| Example 30 | Boehmite | 450 | 10/1 | High | 3/1 | 88 | 65 | Absent |
| Example 31 | Boehmite | 450 | 10/1 | High | 4/1 | 87 | 64 | Absent |
| Example 32 | Boehmite | 450 | 10/1 | High | 5/1 | 85 | 63 | Absent |
| Example 33 | Boehmite | 450 | 10/1 | High | 8/1 | 80 | 63 | Absent |
| Example 34 | Boehmite | 450 | 10/1 | High | 15/1 | 74 | 59 | Absent |
| Example 35 | Boehmite | 450 | 10/1 | High | 20/1 | 70 | 58 | Absent |
| Example 36 | Boehmite | 450 | 10/1 | Low | 25/1 | 72 | 80 | Absent |
| Example 37 | Aluminum hydroxide | 200 | 2/1 | Middle | 1/1 | 75 | 75 | Absent |
| Example 38 | Magnesium hydroxide | 350 | 2/1 | Middle | 1/1 | 82 | 76 | Absent |
| Example 39 | Magnesium sulfate hydrate | 200 | 2/1 | Middle | 1/1 | 82 | 70 | Absent |
| Example 40 | Calcium sulfate hydrate | 160 | 2/1 | Middle | 1/1 | 70 | 79 | Absent |
| Example 41 | Chrysotile | 500 | 5/1 | Middle | 1/1 | 82 | 71 | Absent |
| Example 42 | Antigorite | 500 | 5/1 | Middle | 1/1 | 81 | 72 | Absent |
| Example 43 | Lizardite | 500 | 5/1 | Middle | 1/1 | 80 | 73 | Absent |
| Example 44 | Kaolinite | 500 | 5/1 | Middle | 1/1 | 81 | 72 | Absent |
| Example 45 | Dickite | 500 | 5/1 | Middle | 1/1 | 80 | 71 | Absent |
| Example 46 | Willemseite | 850 | 10/1 | Middle | 1/1 | 89 | 66 | Absent |
| Example 47 | Pyrophyllite | 850 | 10/1 | Middle | 1/1 | 89 | 66 | Absent |
| Example 48 | Saponite | 600 | 5/1 | Middle | 1/1 | 82 | 71 | Absent |
| Example 49 | Hectorite | 600 | 5/1 | Middle | 1/1 | 83 | 72 | Absent |
| Example 50 | Sauconite | 600 | 5/1 | Middle | 1/1 | 82 | 71 | Absent |
| Example 51 | Montmorillonite | 600 | 5/1 | Middle | 1/1 | 85 | 71 | Absent |
| Example 52 | Beidellite | 600 | 5/1 | Middle | 1/1 | 84 | 73 | Absent |
| Example 53 | Nontronite | 600 | 5/1 | Middle | 1/1 | 84 | 74 | Absent |
| Example 54 | Sericite | 700 | 10/1 | High | 1/1 | 81 | 65 | Absent |
| Example 55 | Phlogopite | 700 | 10/1 | High | 1/1 | 82 | 66 | Absent |
| Example 56 | Biotite | 700 | 10/1 | High | 1/1 | 80 | 68 | Absent |
| Example 57 | Lepidolite | 700 | 10/1 | High | 1/1 | 83 | 67 | Absent |
| Example 58 | Margarite | 700 | 10/1 | High | 1/1 | 80 | 69 | Absent |
| Example 59 | Clintonite | 700 | 10/1 | High | 1/1 | 81 | 68 | Absent |
| Example 60 | Anandite | 700 | 10/1 | High | 1/1 | 83 | 65 | Absent |
| Example 61 | Cookeite | 200 | 3/1 | Middle | 1/1 | 79 | 70 | Absent |
| Example 62 | Sudoite | 200 | 3/1 | Middle | 1/1 | 75 | 70 | Absent |
| Example 63 | Clinochlore | 200 | 3/1 | Middle | 1/1 | 73 | 70 | Absent |
| Example 64 | Chamosite | 200 | 3/1 | Middle | 1/1 | 72 | 70 | Absent |
| Example 65 | Nimite | 200 | 3/1 | Middle | 1/1 | 76 | 70 | Absent |
| Example 66 | Sepiolite | 650 | 3/1 | Middle | 1/1 | 83 | 69 | Absent |
| Example 67 | Palygorskite | 650 | 3/1 | Middle | 1/1 | 86 | 69 | Absent |
| Example 68 | Zeolite | 700 | 3/1 | Middle | 1/1 | 81 | 65 | Absent |
| Example 69 | Attapulgite | 300 | 3/1 | Middle | 1/1 | 80 | 70 | Absent |
| Example 70 | Hydrotalcite | 400 | 10/1 | High | 1/1 | 80 | 70 | Absent |
| Example 71 | Hisingerite | 300 | 3/1 | Middle | 1/1 | 72 | 70 | Absent |
| Example 72 | Imogolite | 300 | 3/1 | Middle | 1/1 | 71 | 70 | Absent |
| Example 73 | Allophane | 300 | 3/1 | Middle | 1/1 | 72 | 70 | Absent |
| Comparative Example 1 | — | — | — | — | — | 85 | 500 | Present |
| Comparative Example 2 | Alumina | No endothermic dehydration reaction | 1/1 | Low | 1/1 | 80 | 95 | Absent |
| Comparative Example 3 | Alumina | No endothermic dehydration reaction | 5/1 | Middle | 1/1 | 80 | 90 | Absent |
| Comparative Example 4 | Talc | 850 | 1/1 | Low | 1/1 | 85 | 82 | Absent |
| Comparative Example 5 | Boehmite | 450 | 1/1 | Low | 1/1 | 84 | 85 | Absent |
| Comparative Example 6 | Calcium carbonate | *900 | 5/1 | Middle | 1/1 | 60 | 500 | Present |

*Decomposition temperature (no endothermic reaction)

Table 1 shows that the batteries of Examples 1 to 73 remain in the safe state during the short-circuit test. Even after the cycle test, the batteries of Examples 1 to 73 maintain a capacity retention of more than 70%, which is higher than that of Comparative Example 6.

In contrast, it has been found that the batteries of Comparative Examples 1 and 6 fall into a dangerous state during the short-circuit test. The batteries of Comparative Examples 2 to 5 did not fall into a dangerous state, but increased in temperature more than those of Examples 1 to 73. Therefore, the filler in each of the batteries of Comparative Examples 2 to 5 is less effective in improving heat dissipation than that in those of Examples 1 to 73. A comparison between Examples 1 to 18 and Examples 19 to 36 shows that the filler oriented parallel to the electrode surface can further improve the heat dissipation.

6. Other Embodiments

The embodiments of the present technology described above are not intended to limit the present technology and various modifications and applications thereof are possible without departing from the scope of the present technology.

For example, the values, structures, shapes, materials, raw materials, manufacturing processes, and other features shown in the embodiments and examples are only by way of example, and if necessary, values, structures, shapes, materials, raw materials, manufacturing processes, and other features different from the above may also be used.

The features, methods, processes, configurations, materials, values, and other characteristics in the embodiments and examples may be combined without departing from the scope of the present technology.

In the embodiments and examples described above, a laminated film-type battery structure, a wound electrode structure, and a laminated electrode structure are shown as examples. It will be understood that such examples are non-limiting. The electrolyte of the present technology can also be used in other battery structures such as cylindrical, coin-shaped, square-shaped, or button-shaped batteries.

Figure 17:
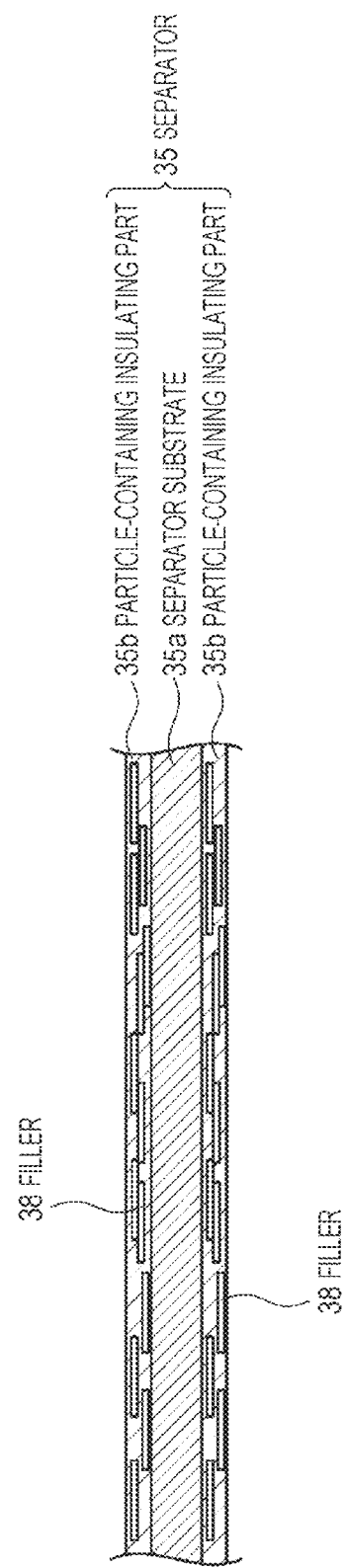
FIG. 17 is a schematic cross-sectional view showing an example of the structure of a separator for use in other embodiments.

In the embodiments described above, as shown in FIG. 17, the separator 35 may include a separator substrate 35a and a particle-containing insulating part (particle-containing insulating layer) 35b provided on at least one of the two principal surfaces of the separator substrate 35a. FIG. 17 shows an example where the particle-containing insulating parts 35b are provided on both principal surfaces of the separator substrate 35a. Alternatively, although not shown, the particle-containing insulating part 35b may be provided one principal surface of the separator substrate 35a.

The particle-containing insulating part 35b and the separator substrate 35a are disposed between the positive and negative electrodes 33 and 34. The particle-containing insulating part 35b includes a filler 38 and a resin. The separator substrate 35a and the nonaqueous electrolyte 36 insulate the positive and negative electrodes 33 and 34 from each other. The separator substrate 35a has the same structure as that of the separator 35 in the first embodiment. The filler 38 and the resin are also the same as those in the first embodiment. In this case, the nonaqueous electrolyte 36 may be free of the filler 38, and the nonaqueous electrolyte 36 may be a liquid electrolytic solution not containing any resin for holding the electrolytic solution.

The present technology may also have the following features.

[1]
A battery including:
electrodes including a positive electrode and a negative electrode; and
a particle-containing insulating part that is provided between the positive electrode and the negative electrode and includes particles and a resin,
wherein the particles are a material capable of undergoing an endothermic dehydration reaction and have a flat shape with an aspect ratio of 2/1 or more.

[2]
The battery according to [1], wherein the endothermic dehydration reaction occurs at a temperature of 160° C. or higher.

[3]
The battery according to any one of [1] and [2], wherein the particles are oriented parallel to a surface of the electrode.

[4]
The battery according to anyone of [1] to [3], wherein the particle-containing insulating part has thermal conduction anisotropy in which a thermal conductivity in a direction perpendicular to a surface of the electrode is lower than that in a direction parallel to the electrode surface.

[5]
The battery according to anyone of [1] to [4], wherein the particles include inorganic particles.

[6]
The battery according to [5], wherein the inorganic particles are at least one of hydrate particles, metal hydroxide particles, and mineral particles.

[7]
The battery according to [6], wherein
the hydrate is at least one selected from the group consisting of magnesium sulfate hydrate and calcium sulfate hydrate,
the metal hydroxide is at least one selected from the group consisting of boehmite, aluminum hydroxide, and magnesium hydroxide, and
the mineral is at least one selected from the group consisting of talc, chrysotile, antigorite, lizardite, kaolinite, dickite, willemseite, pyrophyllite, saponite, hectorite, sauconite, montmorillonite, beidellite, nontronite, sericite, phlogopite, biotite, lepidolite, margarite, clintonite, anandite, cookeite, sudoite, clinochlore, chamosite, nimite, sepiolite, palygorskite, zeolite, attapulgite, hydrotalcite, hisingerite, imogolite, and allophane.

[8]
The battery according to any one of [1] to [7], wherein
the particles are talc particles, and
the particle-containing insulating part has an X-ray diffraction pattern peak intensity ratio ((006) plane diffraction peak intensity/(132) plane diffraction peak intensity) of 10 to 1,000.

[9]
The battery according to any one of [1] to [8], wherein the mass ratio of the particles to the resin (the mass of the particles/the mass of the resin) is from 1/1 to 5/1.

[10]
The battery according to anyone of [1] to [9], wherein the particle-containing insulating part further includes an electrolytic solution held in the resin.

[11]
The battery according to [10], further including a separator, wherein the particle-containing insulating part is provided between the separator and at least one of the negative electrode and the positive electrode.

[12]

The battery according to any one of [10] and [11], wherein the electrolytic solution includes an electrolyte salt and a nonaqueous solvent in which the electrolyte salt is dissolved.

[13]

The battery according to anyone of [1] to [9], further including a separator substrate,
wherein the particle-containing insulating part is provided on at least one surface of the separator substrate and disposed between the separator substrate and at least one of the negative electrode and the positive electrode.

[14]

An electrolyte including particles, an electrolytic solution, and a resin,
wherein the particles are a material capable of undergoing an endothermic dehydration reaction and have a flat shape with an aspect ratio of 2/1 or more.

[15]

A battery pack including:
the battery according to [1];
a control unit configured to control the battery; and
an exterior casing housing the battery.

[16]

An electronic device having the battery according to [1] and being configured to receive electric power from the battery.

[17]

An electrically-driven vehicle including:
the battery according to [1];
a converter configured to receive electric power from the battery and to convert the electric power into a driving force for the vehicle; and
a controller configured to process information about vehicle control based on information about the battery.

[18]

An electrical storage device including the battery according to [1] and being configured to supply electric power to an electronic device connected to the battery.

[19]

The electrical storage device according to [18], further including a power information controller configured to transmit and receive a signal to and from any other device through a network,
the electrical storage device being configured to control charging and discharging of the battery based on information received by the power information controller.

[20]

A power system including the battery according to [1] and being configured to receive electric power from the battery or to allow the battery to receive electric power from a power generator or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

30 Wound electrode assembly
31 Positive electrode lead
32 Negative electrode lead
33 Positive electrode
33A Positive electrode collector
33B Positive electrode active material layer
34 Negative electrode
34A Negative electrode collector
34B Negative electrode active material layer
35 Separator
35a Separator substrate
35b Particle-containing insulating part
36 Nonaqueous electrolyte
37 Protective tape
38 Filler
40 Exterior member
41 Contact film
50 Wound electrode assembly
51 Positive electrode lead
52 Negative electrode lead
53 Positive electrode
53A Positive electrode collector
53B Positive electrode active material layer
54 Negative electrode
54A Negative electrode collector
54B Negative electrode active material layer
55 Separator
56 Gelled electrolyte layer
57 Protective tape
57 Exterior member
60 Contact film
61 Electrode laminate
70 Positive electrode lead
72 Negative electrode lead
73 Positive electrode
74 Negative electrode
75 Separator
76 Fixing member
80 Cell
81 Circuit board
82a Top cover
82b Bottom cover
83 Hard laminated film
84 Notch
85 Soft laminated film
86 Recess
87 Adhesive film
90 Battery pack
301 Assembled battery
301a Secondary battery
302a Charging control switch
302b Diode
303a Discharging control switch
303b Diode
304 Switch unit
307 Current detecting resistor
308 Temperature detecting element
310 Control unit
311 Voltage detecting unit
313 Current measuring unit
314 Switch control unit
317 Memory
318 Temperature detecting unit
321 Positive electrode terminal
322 Negative electrode terminal
400 Electrical storage system
401 House
402 Centralized power system
402a Thermal power generation system 402b Nuclear power generation system
402c Hydraulic power generation system
403 Electrical storage device
404 Power generator
405 Power consumption device
405a Refrigerator
405b Air conditioner
405c Television receiver
405d Bath
406 Electrically-driven vehicle
406a Electric car
406b Hybrid car
406c Electric bike
407 Smart meter
408 Power hub
409 Power network
410 Controller
411 Sensor
412 Information network
413 Server
500 Hybrid vehicle
501 Engine
502 Generator
503 Electric power-driving force converter
504a Driving wheel
504b Driving wheel
505a Wheel
505b Wheel
508 Battery
509 Vehicle controller
510 Sensor
511 Charging port

The invention claimed is:

1. A battery comprising:
electrodes comprising a positive electrode and a negative electrode; and
a particle-containing part that is provided between the positive electrode and the negative electrode and comprises particles and a resin,
wherein the particles are a material capable of undergoing an endothermic dehydration reaction and have a flat shape with an aspect ratio of 2/1 or more, the particles comprise at least one of hydrate particles, metal hydroxide particles, and mineral particles, the hydrate is at least one selected from the group consisting of magnesium sulfate hydrate and calcium sulfate hydrate, the metal hydroxide is at least one selected from the group consisting of boehmite, aluminum hydroxide, and magnesium hydroxide, and the mineral is at least one selected from the group consisting of talc, chrysotile, antigorite, lizardite, kaolinite, dickite, willemseite, pyrophyllite, saponite, hectorite, sauconite, montmorillonite, beidellite, nontronite, sericite, phlogopite, biotite, lepidolite, margarite, clintonite, anandite, cookeite, sudoite, clinochlore, chamosite, nimite, sepiolite, palygorskite, attapulgite, hydrotalcite, hisingerite, imogolite, and allophane.

2. The battery according to claim 1, wherein the endothermic dehydration reaction occurs at a temperature of 160° C. or higher.

3. The battery according to claim 1, wherein the particles are oriented parallel to a surface of the electrode.

4. The battery according to claim 1, wherein the particle-containing part has thermal conduction anisotropy in which a thermal conductivity in a direction perpendicular to a surface of the electrode is lower than that in a direction parallel to the surface of the electrode.

5. The battery according to claim 1, wherein
the particles are talc particles, and
the particle-containing part has an X-ray diffraction pattern peak intensity ratio ((006) plane diffraction peak intensity/(132) plane diffraction peak intensity) of 10 to 1,000.

6. The battery according to claim 1, wherein the mass ratio of the particles to the resin (the mass of the particles/the mass of the resin) is from 1/1 to 5/1.

7. The battery according to claim 1, wherein the particle-containing part further comprises an electrolytic solution held in the resin.

8. The battery according to claim 1, further comprising a separator, wherein the particle-containing part is provided between the separator and at least one of the negative electrode and the positive electrode.

9. The battery according to claim 7, wherein the electrolytic solution comprises an electrolyte salt and a nonaqueous solvent in which the electrolyte salt is dissolved.

10. The battery according to claim 1, further comprising a separator substrate, wherein the particle-containing part is provided on at least one surface of the separator substrate and disposed between the separator substrate and at least one of the negative electrode and the positive electrode.

11. An electrolyte comprising particles, an electrolytic solution, and a resin,
wherein the particles are a material capable of undergoing an endothermic dehydration reaction and have a flat shape with an aspect ratio of 2/1 or more, the particles comprise at least one of hydrate particles, metal hydroxide particles, and mineral particles, the hydrate is at least one selected from the group consisting of magnesium sulfate hydrate and calcium sulfate hydrate, the metal hydroxide is at least one selected from the group consisting of boehmite, aluminum hydroxide, and magnesium hydroxide, and the mineral is at least one selected from the group consisting of talc, chrysotile, antigorite, lizardite, kaolinite, dickite, willemseite, pyrophyllite, saponite, hectorite, sauconite, montmorillonite, beidellite, nontronite, sericite, phlogopite, biotite, lepidolite, margarite, clintonite, anandite, cookeite, sudoite, clinochlore, chamosite, nimite, sepiolite, palygorskite, attapulgite, hydrotalcite, hisingerite, imogolite, and allophane.

12. A battery pack comprising:
the battery according to claim 1;
a control unit configured to control the battery; and
an exterior casing housing the battery.

13. An electronic device having the battery according to claim 1 and being configured to receive electric power from the battery.

14. An electrically-driven vehicle comprising:
the battery according to claim 1;
a converter configured to receive electric power from the battery and to convert the electric power into a driving force for the vehicle; and
a controller configured to process information about vehicle control based on information about the battery.

15. An electrical storage device comprising the battery according to claim 1 and being configured to supply electric power to an electronic device connected to the battery.

16. The electrical storage device according to claim 15, comprising a power information controller configured to transmit and receive a signal to and from any other device through a network, the electrical storage device being configured to control charging and discharging of the battery based on information received by the power information controller.

17. A power system comprising the battery according to claim 1 and being configured to receive electric power from the battery or to allow the battery to receive electric power from a power generator or a power network.

* * * * *